(12) United States Patent
Yeh

(10) Patent No.: US 10,775,953 B2
(45) Date of Patent: Sep. 15, 2020

(54) IN-CELL TOUCH DISPLAY DEVICE AND METHODS FOR TESTING AND MANUFACTURING THE SAME

(71) Applicants: HannStar Display (Nanjing) Corporation, Nanjing (CN); HannStar Display Corporation, Taipei (TW)

(72) Inventor: Cheng-Yen Yeh, Taichung (TW)

(73) Assignees: HannStar Display (Nanjing) Corporation, Nanjing (CN); HannStar Display Corporation, Taipei (TW)

( * ) Notice: Subject to any disclaimer, the term of this patent is extended or adjusted under 35 U.S.C. 154(b) by 0 days.

(21) Appl. No.: 15/861,640

(22) Filed: Jan. 3, 2018

(65) Prior Publication Data

US 2018/0329544 A1 Nov. 15, 2018

(30) Foreign Application Priority Data

May 10, 2017 (CN) .......................... 2017 1 0324945

(51) Int. Cl.
| | | |
|---|---|---|
| *G06F 3/041* | (2006.01) | |
| *G06F 3/047* | (2006.01) | |
| *G06F 11/22* | (2006.01) | |
| *G06F 3/044* | (2006.01) | |
| *G02F 1/1333* | (2006.01) | |

(52) U.S. Cl.
CPC .............. *G06F 3/047* (2013.01); *G06F 3/044* (2013.01); *G06F 3/0412* (2013.01); *G06F 3/0418* (2013.01); *G06F 11/2221* (2013.01); *G02F 1/13338* (2013.01); *G06F 2203/04112* (2013.01)

(58) Field of Classification Search
None
See application file for complete search history.

(56) References Cited

U.S. PATENT DOCUMENTS 8,766,950 B1 7/2014 Morein et al.
2002/0105263 A1* 8/2002 Kim .................... G02F 1/13452
313/498

(Continued)

FOREIGN PATENT DOCUMENTS

CN 104516609 A 4/2015
TW 201236127 A 9/2012

*Primary Examiner* — Lunyi Lao
*Assistant Examiner* — Kirk W Hermann
(74) *Attorney, Agent, or Firm* — CKC & Partners Co., LLC

(57) ABSTRACT

A in-cell touch display device includes first sensing lines, second sensing lines, first touch electrodes electrically connected to the first sensing lines respectively, second touch electrodes electrically connected to the second sensing lines respectively, first and second switches, and first and second touch testing pads. The first and second switches are disposed in a non-display area, in which the first switches have first terminals electrically connected to the first sensing lines, control terminals electrically connected to each other, and second terminals electrically connected to each other. The second switches have first terminals electrically connected to the second sensing lines, control terminals electrically connected to each other, and second terminals electrically connected to each other. The first touch testing pad is electrically connected to the second terminals of the first switches. The second touch testing pad is electrically connected to the second terminals of the second switches.

17 Claims, 28 Drawing Sheets

(56) References Cited

U.S. PATENT DOCUMENTS

| | | | |
|---|---|---|---|
| 2008/0170195 A1 | 7/2008 | Kwon et al. | |
| 2010/0171507 A1* | 7/2010 | Hung | G09G 3/006 324/537 |
| 2012/0218199 A1* | 8/2012 | Kim | G06F 3/0412 345/173 |
| 2013/0088679 A1* | 4/2013 | Lu | G09G 3/006 349/139 |
| 2016/0105952 A1* | 4/2016 | Park | G02F 1/1309 345/174 |
| 2016/0358525 A1* | 12/2016 | Huang | G09G 3/3655 |
| 2016/0379906 A1* | 12/2016 | Kim | G09G 3/3688 257/48 |
| 2017/0228074 A1* | 8/2017 | Du | G02F 1/133514 |
| 2018/0061289 A1* | 3/2018 | Xiong | H01L 22/32 |
| 2018/0181277 A1* | 6/2018 | Ahn | G06F 3/0488 |

* cited by examiner

```
┌─────────────────────────────────────────────────────────┐
│ Provide a turn-on voltage to the control terminals of the switches │──S701
│ through the switch control pad so as to turn on the switches       │
└─────────────────────────────────────────────────────────┘
                              ⇩
┌─────────────────────────────────────────────────────────┐
│ Provide a first voltage to the second terminals of the first switches │
│ and the second terminals of the second switches through the first    │
│ touch testing pad and the second touch testing pad, so as to set a   │
│ predetermined image of the in-cell touch display device as a full    │──S702
│ bright image, and determine whether the displayed image of the       │
│ in-cell touch display device is identical to the full bright image   │
└─────────────────────────────────────────────────────────┘
                              ⇩
┌─────────────────────────────────────────────────────────┐
│ Provide a second voltage to the second terminals of the first        │
│ switches and the second terminals of the second switches through     │
│ the first touch testing pad and the second touch testing pad, so as to │──S703
│ set the predetermined image of the in-cell touch display device as a │
│ full dark image, and determine whether the displayed image of the    │
│ in-cell touch display device is identical to the full dark image     │
└─────────────────────────────────────────────────────────┘
                              ⇩
┌─────────────────────────────────────────────────────────┐
│ Provide a third voltage to the second terminals of the first         │
│ switches through the first touch testing pad, and provide a          │
│ fourth voltage to the second terminals of the second                 │
│ switches through the second touch testing pad, so as to set          │──S704
│ the predetermined image of the in-cell touch display device          │
│ as a first checkerboard image, and determine whether the             │
│ displayed image of the in-cell touch display device is               │
│ identical to the first checkerboard image                            │
└─────────────────────────────────────────────────────────┘
                              ⇩
┌─────────────────────────────────────────────────────────┐
│ Provide a fifth voltage to the second terminals of the first         │
│ switches through the first touch testing pad, and provide a          │
│ sixth voltage to the second terminals of the second switches         │
│ through the second touch testing pad, so as to set the               │──S705
│ predetermined image of the in-cell touch display device as a         │
│ second checkerboard image, and determine whether the                 │
│ displayed image of the in-cell touch display device is               │
│ identical to the second checkerboard image                           │
└─────────────────────────────────────────────────────────┘
```

FIG. 6 ically connected to a circuit which 25 respectively. The first switches and the second switches are

IN-CELL TOUCH DISPLAY DEVICE AND METHODS FOR TESTING AND MANUFACTURING THE SAME

RELATED APPLICATIONS

This application claims priority to China Application Serial Number 201710324945.2 filed May 10, 2017, which is herein incorporated by reference.

BACKGROUND

Field of Invention

The present invention relates to an in-cell touch display device. More particularly, the present invention relates to a method for testing touch electrodes and a method for manufacturing the related in-cell touch display device.

Description of Related Art

In an in-cell touch display device, touch electrodes are disposed in pixels to provide a touch function. In general, the touch electrodes are electrically connected to a circuit which can detect a capacitance variance on each touch electrode to determine whether the touch display is touched at a corresponding location. However, the touch electrodes may be shorted or open that would affect the touch function. Therefore, it is an issue in the art about how to detect if the touch electrodes are shorted or open.

SUMMARY

In an in-cell touch display device of the present invention, testing pads in a non-display area are used to determine whether the touch electrodes are shorted or open.

Embodiments of the present invention provide an in-cell touch display device having a display area and a non-display area. The in-cell touch display device includes a first substrate and the following units. Multiple data lines and multiple gate lines are disposed on the first substrate. Multiple touch electrodes include multiple first touch electrodes and multiple second touch electrodes. Multiple sensing lines include multiple first sensing lines and multiple second sensing lines. The first touch electrodes are electrically connected to the first sensing lines respectively. The second touch electrodes are electrically connected to the second sensing lines respectively. Multiple switches are disposed on the first substrate and in the non-display area. Each of the switches has a first terminal, a second terminal and a control terminal. The switches include first switches and second switches. The first terminals of the first switches are electrically connected to the first sensing lines respectively. The control terminals of the first switches are electrically connected to each other. The second terminals of the first switches are electrically connected to each other. The first terminals of the second switches are electrically connected to the second sensing lines respectively. The control terminals of the second switches are electrically connected to each other. The second terminals of the second switches are electrically connected to each other. A first touch testing pad and a second touch testing pad are disposed on the first substrate and in the non-display area. The first touch testing pad is electrically connected to the second terminals of the first switches. The second touch testing pad is electrically connected to the second terminals of the second switches.

In some embodiments, the touch electrodes are arranged as multiple touch electrode columns and multiple touch electrode rows. Each of the touch electrode rows includes a portion of the first touch electrodes and the second touch electrodes which are interleaved with each other. Each of the touch electrode columns includes a portion of the first touch electrodes and the second touch electrodes which are interleaved with each other.

In some embodiments, multiple touch pads are disposed on the first substrate and in the non-display area. The touch pads include multiple first touch pads and multiple second touch pads. The first touch pads are electrically connected to the first sensing lines respectively. The second touch pads are electrically connected to the second sensing lines respectively. The first switches, the second switches and the touch pads are disposed in the non-display area at a side of the display area. Each of the first switches is electrically connected to a corresponding first sensing line through a corresponding first touch pad. Each of the second switches is electrically connected to a corresponding second sensing line through a corresponding second touch pad.

In some embodiments, multiple touch pads are disposed in the non-display area at a side of the display area. The touch pads are electrically connected to the sensing lines respectively. The first switches and the second switches are disposed in the non-display area at at least one of other sides of the display area.

In some embodiments, the first switches and the second switches are turned off in a display period and a touch sensing period of the in-cell touch display device.

In some embodiments, a switch control pad is disposed on the first substrate and in the non-display area. The switch control pad is electrically connected to the control terminals of the first switches and the control terminals of the second switches. A voltage of the switch control pad is equal to a turn-off voltage in the display period and in the touch sensing period of the in-cell touch display device, so as to turn off the first switches and the second switches.

In some embodiments, an integrated circuit chip is electrically connected to the switch control pad. The integrated circuit chip provides the turn-off voltage to the switch control pad.

In some embodiments, in a display period of the in-cell touch display device, voltages of the first touch testing pad and the second touch testing pad are equal to a common voltage, and the first switches and the second switches are turned on. In a touch sensing period of the in-cell touch display device, the first switches and the second switches are turned off.

In some embodiments, a switch control pad is disposed on the first substrate and in the non-display area. The switch control pad is electrically connected to the control terminals of the first switches and the control terminals of the second switches. In the display period, a voltage of the switch control pad is equal to a turn-on voltage so as to turn on the first switches and the second switches. In the touch sensing period, the voltage of the switch control pad is equal to a turn-off voltage so as to turn off the first switches and the second switches.

In some embodiments, an integrated circuit chip is electrically connected to the switch control pad. The integrated circuit chip provides the turn-on voltage for the switch control pad in the display period, and provides the turn-off voltage for the switch control pad in the touch sensing period.

In some embodiments, the data lines include first data lines and second data lines, and the first data lines are interleaved with the second data lines. The switches further include third switches and fourth switches. The first terminals of the third switches are electrically connected to the first data lines, the control terminals of the third switches are electrically connected to each other, and the second terminals of the third switches are electrically connected to each other. The first terminals of the fourth switches are electrically connected to the second data lines, the control terminals of the fourth switches are electrically connected to each other, and the second terminals of the fourth switches are electrically connected to each other. The in-cell touch display device further includes a first source testing pad and a second source testing pad disposed on the first substrate and in the non-display area. The first source testing pad is electrically connected to the second terminals of the third switches, and the second source testing pad is electrically connected to the second terminals of the fourth switches.

In some embodiments, the third switches and the fourth switches are turned off in a display period and a touch sensing period of the in-cell touch display device.

In some embodiments, the data lines include first data lines, second data lines and third data lines. The first data lines, the second data lines and the third data lines are electrically connected to multiple pixel units with different colors respectively. The switches further include third switches, fourth switches, and fifth switches. The first terminals of the third switches are electrically connected to the first data lines respectively, the control terminals of the third switches are electrically connected to each other, and the second terminals of the third switches are electrically connected to each other. The first terminals of the fourth switches are electrically connected to the second data lines respectively, the control terminals of the fourth switches are electrically connected to each other, and the second terminals of the fourth switches are electrically connected to each other. The first terminals of the fifth switches are electrically connected to the third data lines respectively, the control terminals of the fifth switches are electrically connected to each other, and the second terminals of the fifth switches are electrically connected to each other. The in-cell touch display device further includes a first source testing pad, a second source testing pad and a third source testing pad disposed on the first substrate and in the non-display area. The first source testing pad is electrically connected to the second terminals of the third switches, the second source testing pad is electrically connected to the second terminals of the fourth switches, and the third source testing pad is electrically connected to the second terminals of the fifth switches.

In some embodiments, the third switches, the fourth switches and the fifth switches are turned off in a display period and a touch sensing period of the in-cell touch display device.

In some embodiments, multiple source pads are disposed on the first substrate and in the non-display area. The source pads include multiple first source pads electrically connected to the first data lines respectively, multiple second source pads electrically connected to the second data lines respectively, and multiple third source pads electrically connected to the third data lines respectively. Each of the third switches is electrically connected to a corresponding first data line through a corresponding first source pad. Each of the fourth switches is electrically connected to a corresponding second data line through a corresponding second source pad. Each of the fifth switches is electrically connected to a corresponding third data line through a corresponding third source pad.

From another aspect, embodiments of the present invention provide an in-cell touch display device having a display area and a non-display area. The in-cell touch display device includes a first substrate and the following units. Multiple data lines and multiple gate lines are disposed on the first substrate. Multiple touch electrodes include multiple first touch electrodes and multiple second touch electrodes. Multiple sensing lines include multiple first sensing lines and multiple second sensing lines. The first touch electrodes are electrically connected to the first sensing lines respectively. The second touch electrodes are electrically connected to the second sensing lines respectively. Multiple touch pads are disposed on the first substrate and in the non-display area. The touch pads include multiple first touch pads and multiple second touch pads. The first touch pads are electrically connected to the first sensing lines respectively. The second touch pads are electrically connected to the second sensing lines respectively. Multiple source pads are disposed on the first substrate and in the non-display area. The source pads are electrically connected to the data lines respectively. Multiple switches are disposed on the first substrate and in the non-display area. Each of the switches has a first terminal, a second terminal and a control terminal. The switches include first switches and second switches. The first terminals of the first switches are electrically connected to the first touch pads respectively. The control terminals of the first switches are electrically connected to each other. The second terminals of the first switches are electrically connected to each other. The first terminals of the second switches are electrically connected to the second touch pads respectively. The control terminals of the second switches are electrically connected to each other. The second terminals of the second switches are electrically connected to each other. An integrated circuit chip is disposed in the non-display area. The integrated circuit chip includes multiple first bonding pads and multiple second bonding pads. The first bonding pads are electrically connected to the source pads respectively. The second bonding pads are electrically connected to the touch pads respectively.

In some embodiments, the first and second switches are turned off in a touch sensing period of the in-cell touch display device. The first and second switches are turned on or turned off in a display period of the in-cell touch sensing device.

In some embodiments, the data lines include multiple first data lines, multiple second data lines and multiple third data lines. The source pads include multiple first source pads, multiple second source pads and multiple third source pads. The first data lines, the second data lines and the third data lines are electrically connected to multiple pixel units with different colors respectively. The first source pads are electrically connected to the first data lines respectively. The second source pads are electrically connected to the second data lines respectively. The third source pads are electrically connected to the third data lines respectively. The touch pads, the first source pads, the second source pads, and the third source pads are respectively arranged as a first row, a second row, a third row and a fourth row extending along a first direction.

In some embodiments, the data lines include multiple first data lines, multiple second data lines and multiple third data lines. The source pads include multiple first source pads, multiple second source pads and multiple third source pads. The first data lines, the second data lines and the third data lines are electrically connected to multiple pixel units with different colors respectively. The first source pads are electrically connected to the first data lines respectively. The second source pads are electrically connected to the second data lines respectively. The third source pads are electrically connected to the third data lines respectively. The touch pads, the first source pads, the second source pads, and the third source pads are arranged as a first row, a second row, and a third row extending along a first direction. At least one of the first source pads is disposed between two of the touch pads in the first row. At least one of the second source pads is disposed between two of the touch pads in the second row. At least one of the third source pads is disposed between two of the touch pads in the third row.

From another aspect, embodiments of the present invention provide a testing method for an in-cell touch display device having a display area and a non-display area. The in-cell touch display device includes a first substrate, touch electrodes, sensing lines, and switches. The touch electrodes include first touch electrodes and second touch electrodes. The touch electrodes are arranged as touch electrode rows and touch electrode columns. Each of the touch electrode rows includes a portion of the first touch electrodes and the second touch electrodes which are interleaved with each other. Each of the touch electrode columns includes a portion of the first touch electrode and the second touch electrode which are interleaved with each other. The sensing lines includes first sensing lines and second sensing lines. The first touch electrodes are electrically connected to the first sensing lines respectively, and the second touch electrodes are electrically connected to the second sensing lines respectively. The switches are disposed on the first substrate and in the non-display area. The switches include first switches and second switches. Each of the switches has a first terminal, a second terminal and a control terminal. The first terminals of the first switches are electrically connected to the first sensing lines respectively, the control terminals of the first switches are electrically connected to each other, and the second terminals of the first switches are electrically connected to each other. The first terminals of the second switches are electrically connected to the second sensing lines respectively, the control terminals of the second switches are electrically connected to each other, and the second terminals of the second switches are electrically connected to each other. The testing method includes: (a) providing a turn-on voltage to the control terminals of the first switches and the control terminals of the second switches, so as to turn on the first switches and the second switches; (b) providing a first voltage to the second terminals of the first switches and the second terminals of the second switches so as to set a predetermined image of the in-cell touch display device as a full bright image, and test if a displayed image of the in-cell touch display device is identical to the full bright image; (c) providing a second voltage to the second terminals of the first switches and the second terminals of the second switches so as to set the predetermined image of the in-cell touch display device as a full dark image, and testing if the displayed image of the in-cell touch display device is identical to the full dark image; (d) providing a third voltage to the second terminals of the first switches, providing a fourth voltage different from the third voltage to the second terminals of the second switches, so as to set the predetermined image of the in-cell touch display device as a first checkerboard image, and determining if the displayed image of the in-cell touch display device is identical to the first checkerboard image; and (e) providing a fifth voltage to the second terminals of the first switches, providing a sixth voltage different from the fifth voltage to the second terminals of the second switches, so as to set the predetermined image of the in-cell touch display device as a second checkerboard image, and testing if the displayed image of the in-cell touch display device is identical to the second checkerboard image.

Compared with prior art, the present invention has an advantage of testing whether the touch electrodes are shorted or open by the testing pads in the non-display area.

BRIEF DESCRIPTION OF THE DRAWINGS

The invention can be more fully understood by reading the following detailed description of the embodiment, with reference made to the accompanying drawings as follows:

FIG. 6 is a flow chart illustrating a testing method for the in-cell touch display device in accordance with an embodiment.

FIG. 9A is performed.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1:
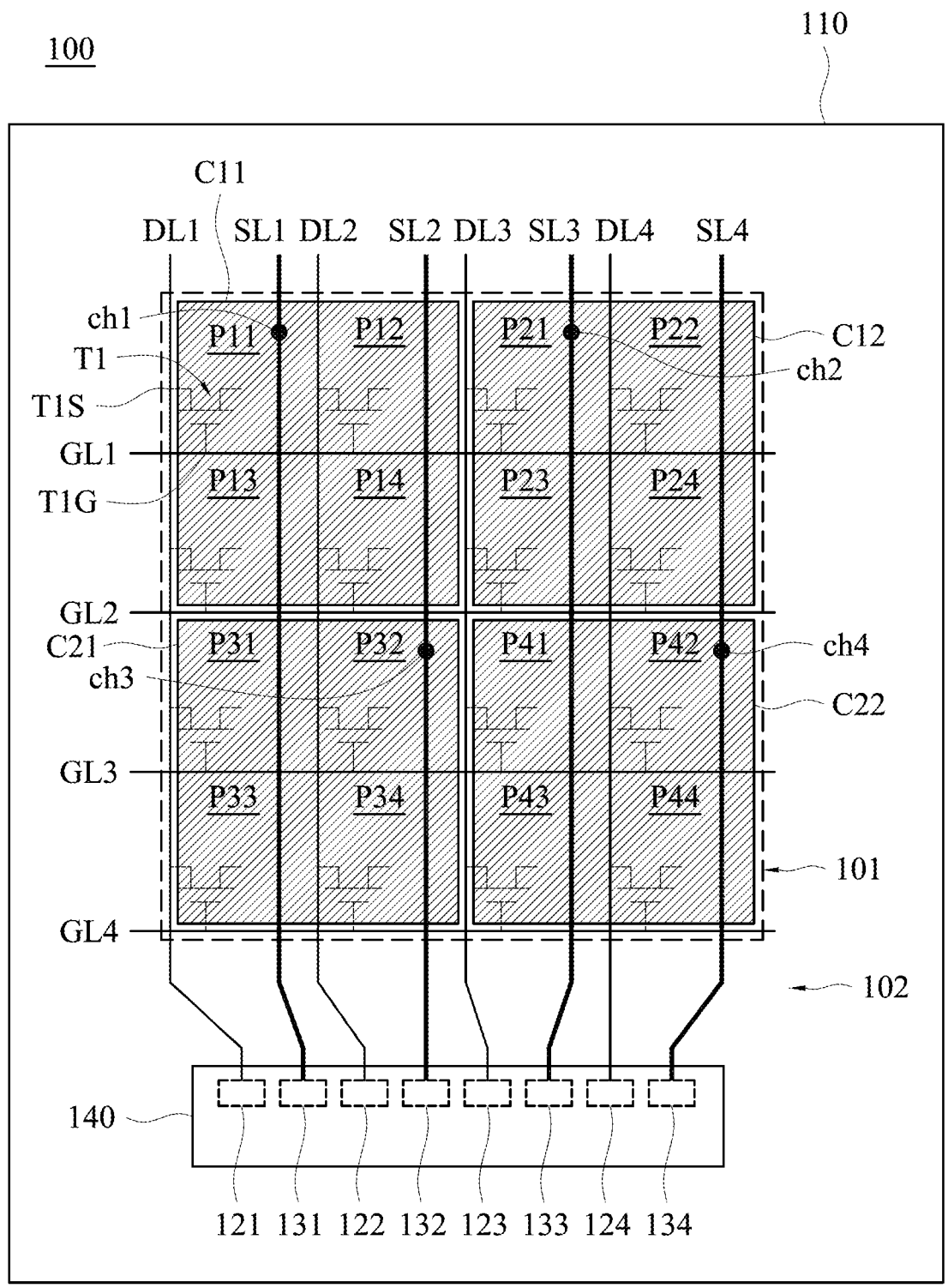
FIG. 1 is a schematic diagram illustrating connections of sensing lines in an in-cell touch display device in accordance with an embodiment.

FIG. 1 is a schematic diagram illustrating connections of sensing lines in an in-cell touch display device in accordance with an embodiment. Referring to FIG. 1, an in-cell touch display device 100 has a display area 101 and a non-display area 102. The in-cell touch display device 100 includes a first substrate 110, multiple gate lines GL1-GL4 extending along a first direction D1, multiple data lines DL1-DL4 extending along a second direction D2, and multiple sensing lines SL1-SL4 extending along the second direction D2 on the first substrate 110. The first direction D1 is not parallel with the second direction D2. In the embodiment, the first direction D1 is perpendicular to the second direction D2, but the invention is not limited thereto. The gate lines GL1-GL4 and the data lines DL1-DL4 define multiple pixel regions. Pixel structures P11-P14, P21-P24, P31-P34, and P41-P44 are disposed in the pixel regions. In the invention, the numbers of the gate lines, the data lines and the pixel structures are not limited to the example of FIG. 1. Each pixel structure includes a thin film transistor (TFT). Each of the data lines DL1-DL4 is electrically connected to the source of the TFT in the corresponding pixel structure, and each of the gate lines GL1-GL4 is electrically connected to the gate of the TFT in the corresponding pixel structure. For example, the pixel structure P11 includes a TFT T1 having a gate T1G and a source T1S. The gate line GL1 is electrically connected to the gate T1G, and the data line DL1 is electrically connected to the source T1S. In addition, the in-cell touch display device 100 further includes touch electrodes C11, C12, C21, and C22. In the embodiment, each touch electrode includes common electrodes of multiple pixel structures. In other words, more than one common electrodes of the pixel structures are electrically connected to each other as one touch electrode. That is, the touch electrodes serve as common electrodes for displaying images in a display period of the in-cell touch display device 100, and the touch electrodes are used to detect a user's touch in a touch sensing period. For example, a transparent conductive layer is patterned as multiple electrode blocks, and each of the electrode blocks corresponds to at least one pixel unit. The electrode blocks serve as common electrodes in the display period, and serve as touch electrodes in the touch sensing period. As shown in FIG. 1, the touch electrode C11 includes common electrodes of the pixel structures P11-P14; the touch electrode C12 includes common electrodes of the pixel structures P21-P24; the touch electrode C21 includes common electrodes of the pixel structures P31-P34; and the touch electrode C22 includes common electrodes of the pixel structures P41-P44. The touch electrodes C11, C12, C21 and C22 are electrically insulated from each other. In the embodiment, the area of each touch electrode is overlapped with the area of more than one pixel structures when viewed in a direction perpendicular to the first substrate. The number of the common electrodes constituting one touch electrode is just an example, and the invention is not limited thereto. In a varied embodiment, more or less common electrodes of the pixel structures are electrically connected to each other as one touch electrode. Each touch electrode is electrically connected to at least one sensing line. In the embodiment, the touch electrodes are electrically connected to the sensing lines through contact holes. For example, the touch electrode C11 is electrically connected to the sensing line SL1 through the contact hole ch1; the touch electrode C12 is electrically connected to the sensing line SL3 through the contact hole ch2; the touch electrode C21 is electrically connected to the sensing line SL2 through the contact hole ch3; and the touch electrode C22 is electrically connected to the sensing line SL4 through the contact hole ch4.

Multiple source pads 121-124 and touch pads 131-134 are disposed on the first substrate 110 and in the non-display area 102. The source pads 121-124 and the touch pads 131-134 are electrically connected to an integrated circuit chip 140. The source pads 121-124 are electrically connected to the data lines DL1-DL4 respectively. The touch pads 131-134 are electrically connected to the sensing lines SL1-SL4 respectively. For example, the integrated circuit chip 140 has multiple bonding pads, on which bumps are disposed, and the bumps of the integrated circuit chip 140 are electrically connected to the source pads 121-124 and the touch pads 131-134 through a conductive film (e.g. anisotropic conductive film). However, the electrical connection between the integrated circuit chip 140 and the source pads 121-124 and the touch pads 131-134 is not limited thereto. In the embodiment, the integrated circuit chip 140 includes a data driving circuit and a touch sensing circuit, but the invention is not limited thereto. In a varied embodiment, the integrated circuit chip 140 further includes a gate driving circuit. In addition, in the embodiment of FIG. 1, the number of the integrated circuit chip is one, but the invention is not limited thereto. In a varied embodiment, the number of the integrated circuit chip may be more than one. A frame period is at least divided into at least one display period and at least one touch sensing period. In the display period, the touch electrodes C11, C12, C21, and C22 are supplied with a common voltage, the voltages of the gate lines GL1-GL4 are used to turn on the corresponding TFTs, and the integrated circuit chip 140 transmits pixel data to pixel electrodes of the pixel structures through the data lines DL1-DL4 to decide the grey levels of the corresponding pixels. In the touch sensing period, the touch electrodes C11, C12, C21, and C22 are used for sensing a touch operation when a user performs on the in-cell touch display device 100.

Figure 2:
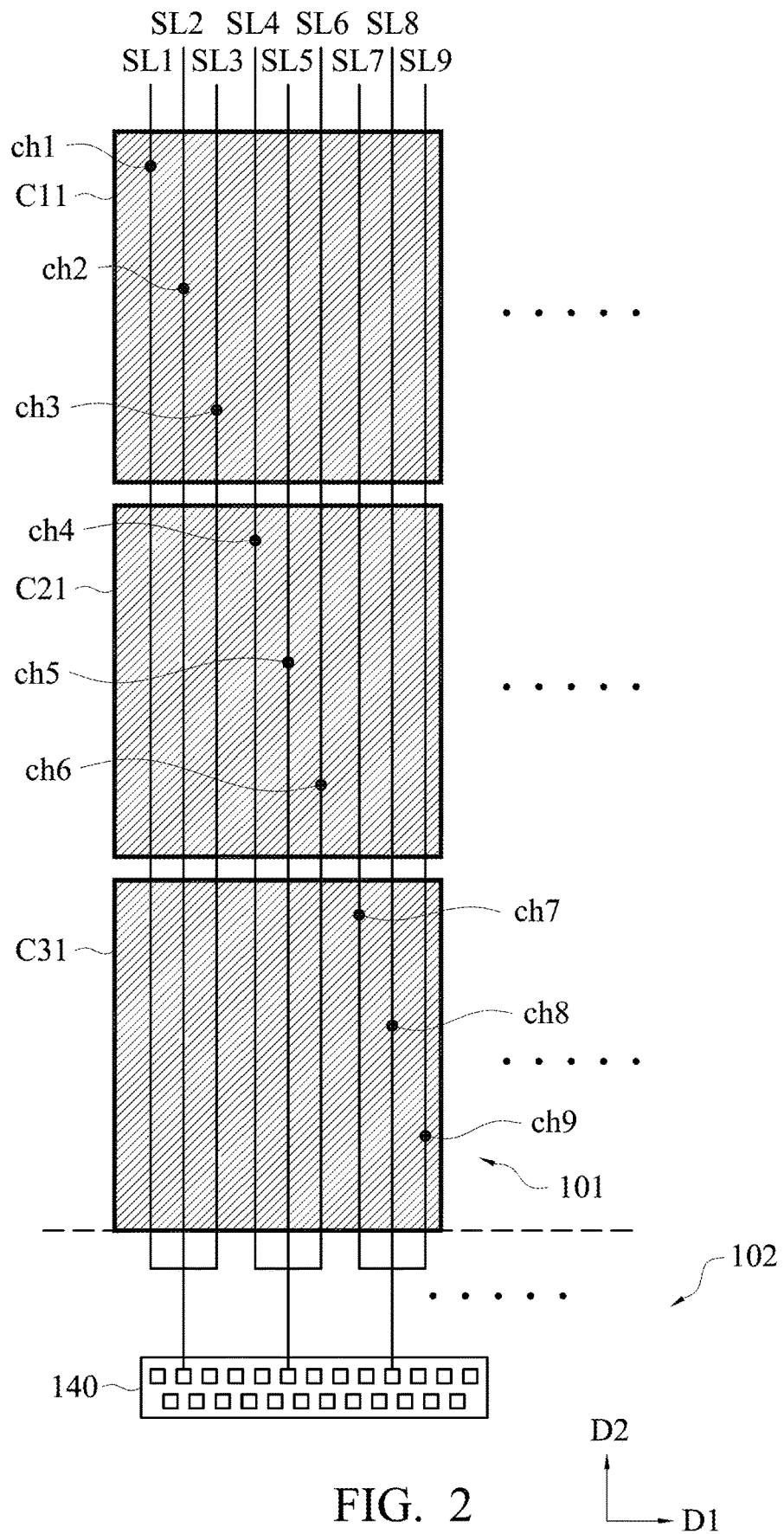
FIG. 2 is a schematic diagram illustrating connections between the sensing lines and an integrated circuit chip in accordance with an embodiment.

In FIG. 1, each touch electrode is electrically connected to one sensing line, but the invention is not limited thereto. In some embodiments, each touch electrode is electrically connected to more than one sensing lines which are electrically connected to the same touch pad in order to reduce the resistance between the touch electrode and the touch pad. For example, more than one sensing lines are electrically connected to one touch electrode in the display area 101, the sensing lines are coupled to each other as one sensing line in the non-display area 102, and the one sensing line is electrically connected to one touch pad in the non-display area 102, but the invention is not limited thereto. Referring to FIG. 2, FIG. 2 is a schematic diagram illustrating connections between the sensing lines and the integrated circuit chip in accordance with an embodiment. For simplification, the data lines, the gate lines, etc. are not shown in FIG. 2. In the embodiments of FIG. 2, the sensing lines SL1-SL3 are electrically connected to the touch electrode C11 through the contact holes ch1-ch3 respectively, and the sensing lines SL1-SL3 are electrically connected to the same touch pad in the non-display area 102. The sensing lines SL4-SL6 are electrically connected to the touch electrode C21 through the contact holes ch4-ch6 respectively, and the sensing lines S4-S6 are electrically connected to the same touch pad in the non-display area 102. The sensing lines SL7-SL9 are electrically connected to the touch electrode C31 through the contact holes ch7-ch9 respectively, and the sensing lines SL7-SL9 are electrically connected to the same touch pad in the non-display area 102. Compared with the embodiment of FIG. 1, in FIG. 2, each touch electrode is electrically connected to one touch pad through three parallel sensing lines, and thus the resistance is reduced and the accuracy of the touch sensing is improved. The number of the sensing lines which are electrically connected to each touch electrode is not limited in the invention.

Figure 3A:
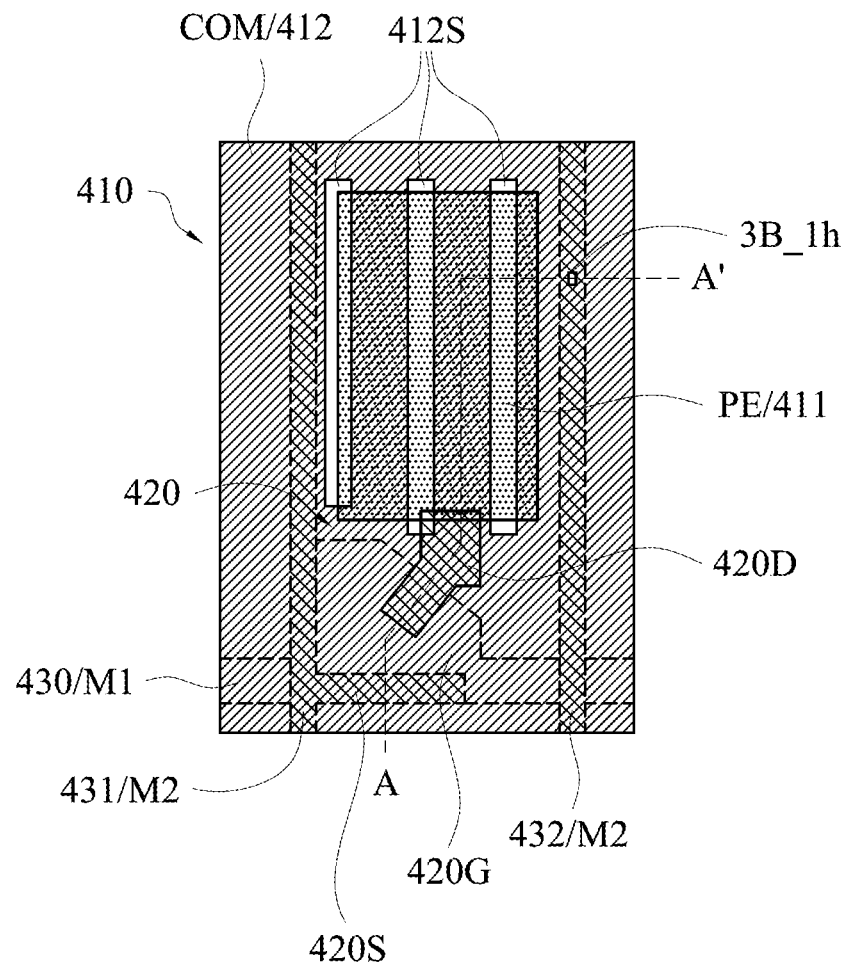
FIG. 3A is a schematic top view of a pixel structure in accordance with an embodiment.
Figure 3B:
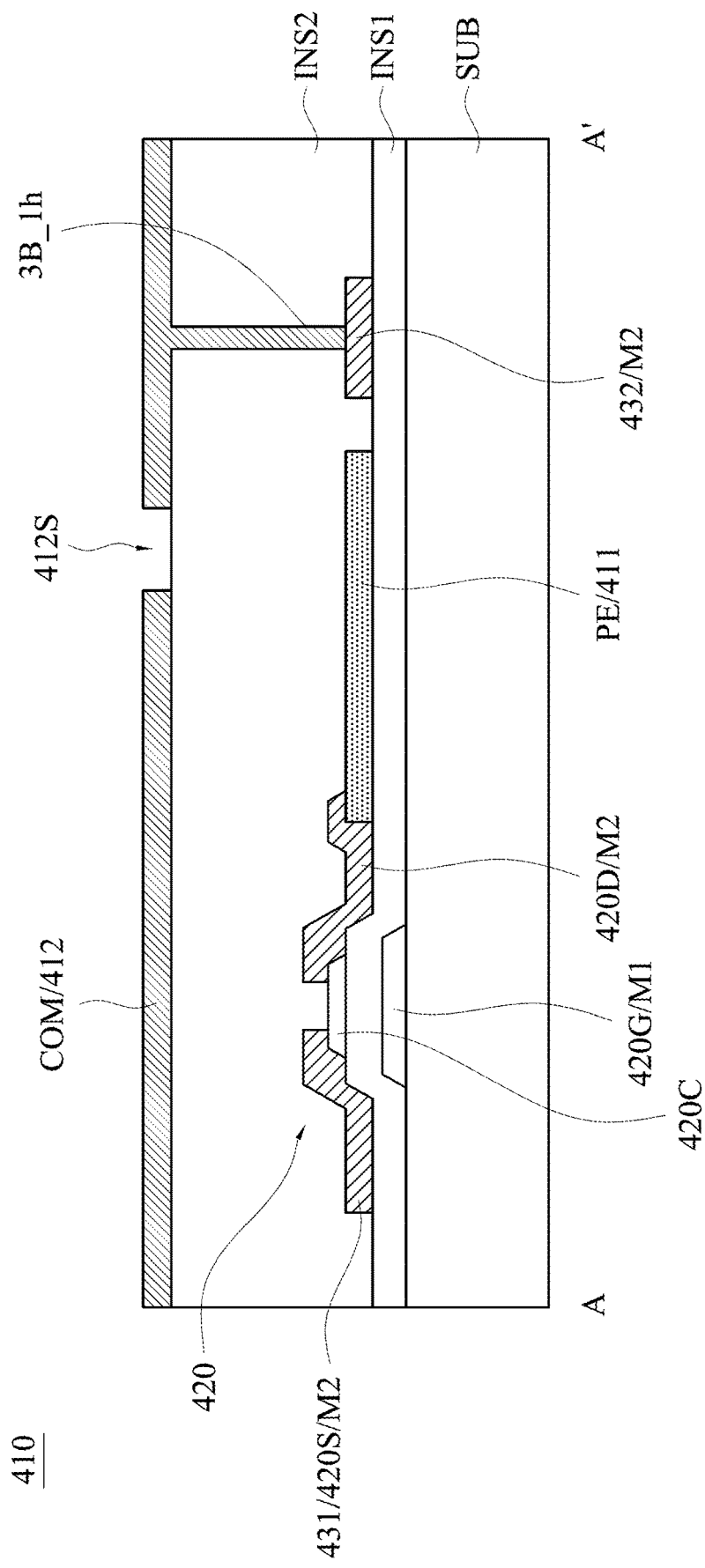
FIG. 3B is a cross-sectional view of the pixel structure viewed along a cross-sectional line AA' of FIG. 3A.

FIG. 3A is a schematic top view of a pixel structure in accordance with an embodiment. FIG. 3B is a cross-sectional view of the pixel structure viewed along a cross-sectional line AA' of FIG. 3A. Referring to FIG. 3A and FIG. 3B, a pixel structure 410 is taken as an example, the pixel structure 410 has a TFT 420, a pixel electrode PE and a common electrode COM. The TFT 420 has a gate 420G, a source 420S and a drain 420D. In detail, a first metal layer M1 is formed on a substrate SUB, and the first metal layer M1 includes the gate 420G and the gate line 430. The gate 420G is connected to the gate line 430. A first insulation layer INS1 is formed on the first metal layer M1. A semiconductor layer 420C is formed on the first insulation layer INS1. A first transparent conductive layer 411 is formed on the first insulation layer INS1. The first transparent conductive layer 411 includes the pixel electrode PE. A second metal layer M2 is formed on the first insulation layer INS1 and the first transparent conductive layer 411. The second metal layer M2 includes the source 420S, the drain 420D, a data line 431 and a sensing line 432. The data line 431 is connected to the source 420S. The drain 420D is electrically connected to the pixel electrode PE. The second insulation layer INS2 is formed on the second metal layer M2, and includes a contact hole 3B_1h to expose the sensing line 432. A second transparent conductive layer 412 is formed on the second insulation layer INS2. The second transparent conductive layer 412 includes the common electrode COM which is electrically connected to the sensing line 432 through a contact hole 3B_1h. The common electrode COM has multiple slits 412S. In the display period, a common voltage is applied to the common electrode COM, and the electric field between the common electrode COM and the pixel electrode PE is configured to control the orientation of liquid crystal; in the touch sensing period, the common electrode COM serve as the touch electrode.

Figure 4A:
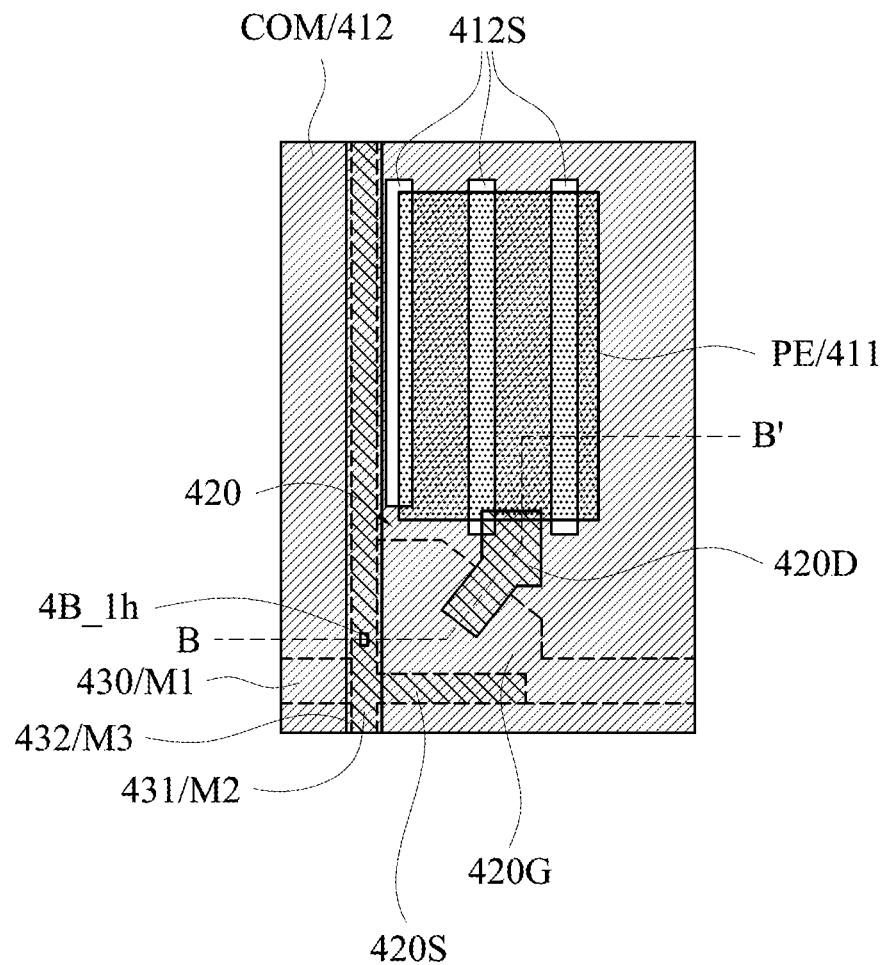
FIG. 4A is a schematic top view of the pixel structure in accordance with an embodiment.
Figure 4B:
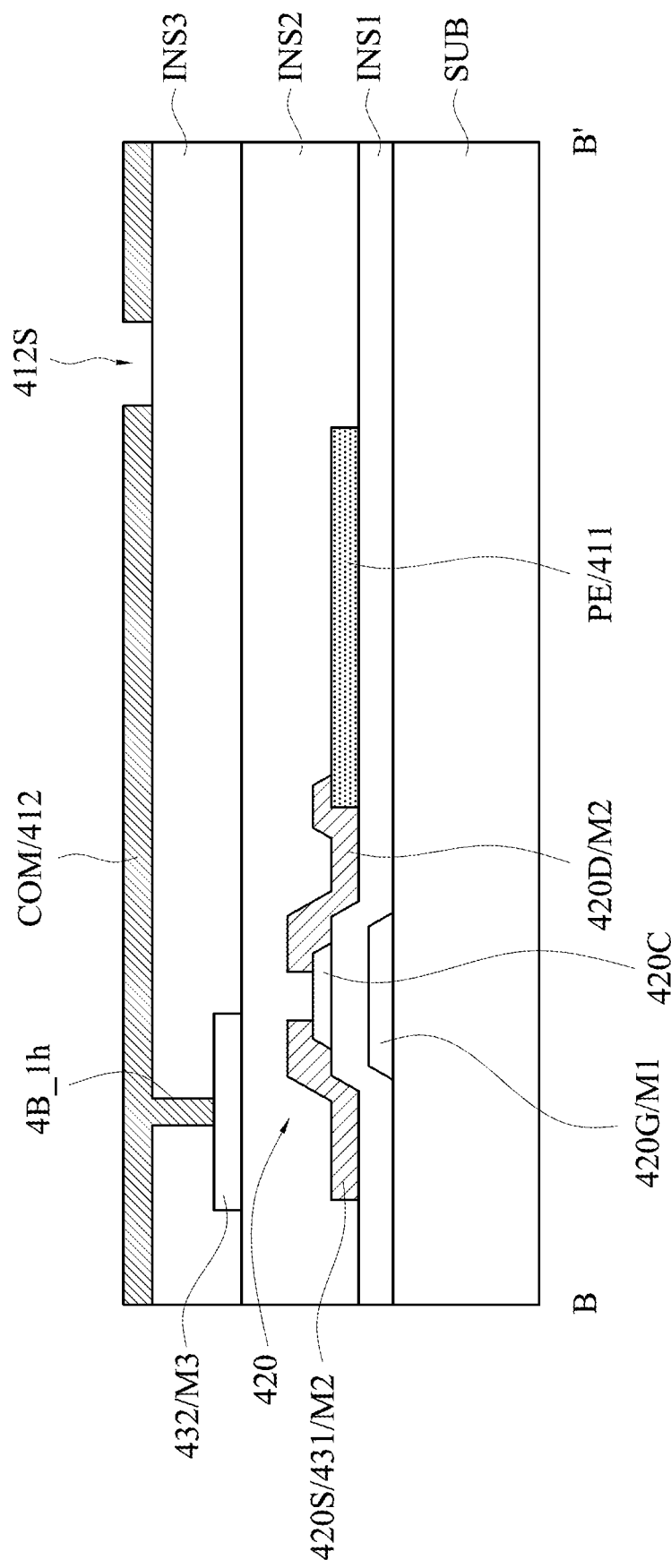
FIG. 4B is a cross-sectional view of the pixel structure viewed along a line BB' of FIG. 4A.

In the embodiments of FIG. 3A and FIG. 3B, the data line 431 and the sensing line 432 are formed by the same metal layer, but these two lines may be formed by different metal layers in other embodiments. FIG. 4A is a schematic top view of the pixel structure in accordance with an embodiment. FIG. 4B is a cross-sectional view of the pixel structure viewed along a cross-sectional line BB' of FIG. 4A. The portion of FIG. 4A and FIG. 4B that is similar to FIG. 3A and FIG. 3B will not be described again. Referring to FIG. 4A and FIG. 4B, the third metal layer M3 is formed on the second insulation layer INS2, and includes the sensing line 432. The third insulation layer INS3 is formed on the third metal layer M3, and includes a contact hole 4B_1h to expose the sensing line 432. The second transparent conductive layer 412 is formed on the third insulation layer INS3, and includes the common electrode COM which is electrically connected to the sensing line 432 through the contact hole 4B_1h. In particular, the sensing line 432 is disposed above the data line 431, and the data line 431 is at least partially overlapped with the sensing line 432 when viewed in a direction perpendicular to the substrate SUB.

In summary, the sensing line and the data line may be formed by the same metal layer, and the sensing line is spaced from the data line when viewed in a direction perpendicular to the substrate so that they are insulated from the each other. Because a metal layer is patterned to form the sensing lines and the data lines simultaneously in this embodiment, the number of process steps can be saved. Alternatively, the sensing line and the data line may be formed by different metal layers, at least one portion of the sensing line is overlapped with the data line when viewed in a direction perpendicular to the substrate, and the sensing line is above the data line with an insulation layer disposed therebetween so that they are insulated from the each other. Because the sensing line and the data line are formed in different metal layers, and at least one portion of the sensing line is overlapped with the data line in this embodiment, the aperture ratio of the pixel structure can be increased compared the former embodiment although the number of the process steps is greater than that of the former embodiment. In addition, the metal layer in the specification may be a single layer of aluminum, copper, titanium, tungsten, etc. or a compound layer of molybdenum-aluminum-molybdenum, titanium-aluminum-titanium, titanium-copper-titanium, etc. which is not limited in the invention. On the other hand, the insulation layer in the specification may be silicon nitride, silicon oxide, silicon oxynitride or other suitable insulation layers. Furthermore, one insulation layer shown in the figures may include two or more than two insulation layers stacked with each other with different material. The transparent conductive layer may be indium tin oxide (ITO), indium zinc oxide (IZO), antimony tin oxide (ATO), fluorine tin oxide (FTO), or other conductive and transparent material.

In the embodiment above, the common electrode COM is formed above the pixel electrode PE, but the common electrode COM may be formed beneath the pixel electrode which is not limited in the invention. Moreover, in the embodiment above, the touch electrode is formed on the substrate SUB (also referred to as a first substrate), but the touch electrode and the sensing line may be formed on a second substrate opposite to the first substrate in other embodiments. That is, the touch electrode is formed on the surface of the second substrate facing the first substrate, and the touch electrode and the sensing line are electrically connected to the touch pad on the first substrate through a conductive film or an adhesive with conductive particles, which is not limited in the invention.

Figure 5:
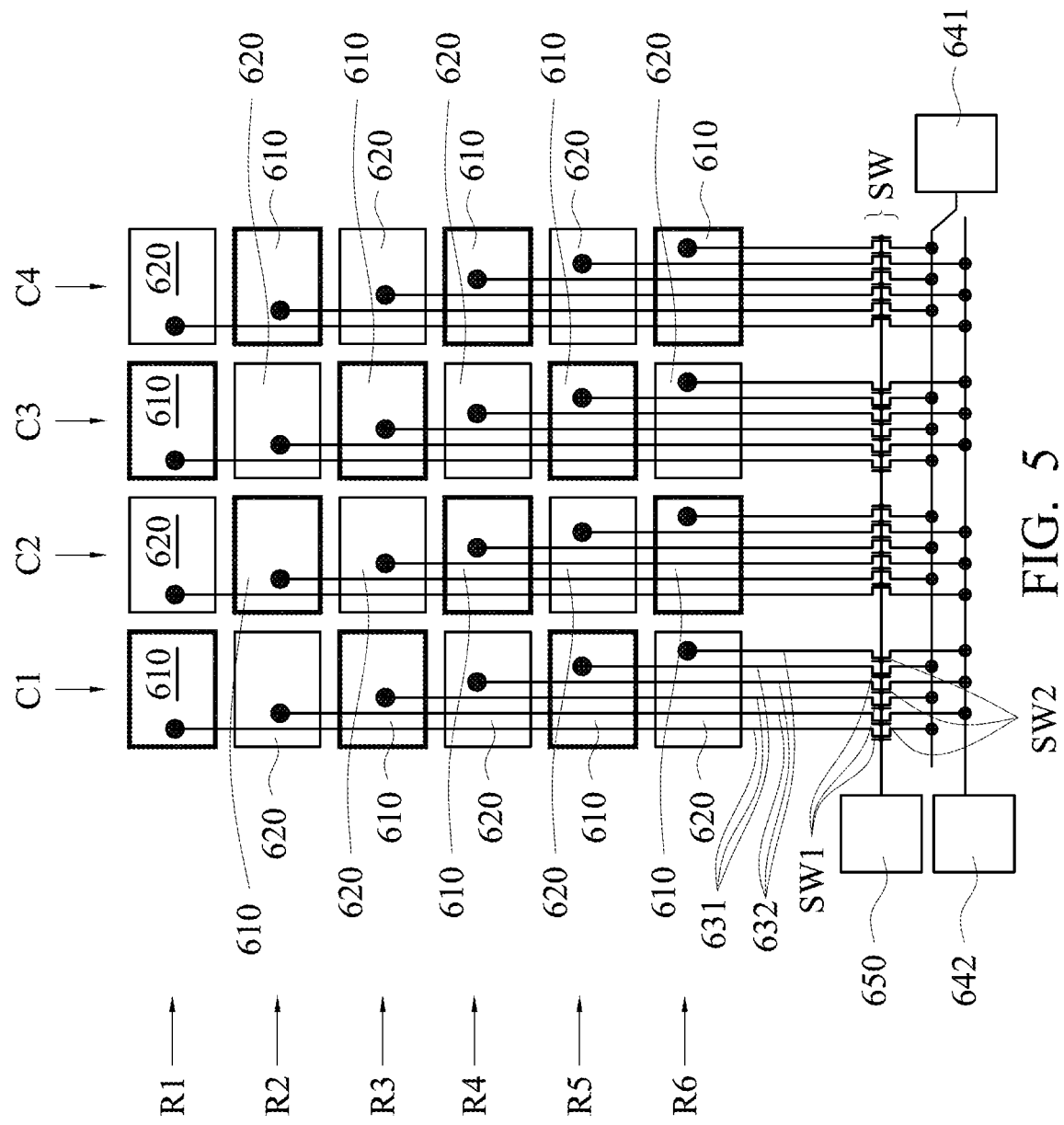
FIG. 5 is a schematic circuit diagram for testing the touch electrode in accordance with an embodiment.

FIG. 5 is a schematic circuit diagram for testing of the touch electrode in accordance with an embodiment. Referring to FIG. 5, for simplification, the touch electrodes and the sensing lines are shown in FIG. 5, but the pixel structures, the gate lines, the data lines, etc. are not shown. The touch electrodes in FIG. 5 are arranged as touch electrode columns C1-C4 and touch electrode rows R1-R6, and these touch electrodes are divided into first touch electrodes 610 and second touch electrodes 620 which are interleaved with each other. Note that in FIG. 5, the edges of the first touch electrode 610 are illustrated by bold lines in order to discriminate between the first touch electrodes 610 and the second touch electrodes 620. Each of the touch electrode columns C1-C4 includes a portion of the first touch electrodes 610 and the second touch electrodes 620 which are interleaved with each other. Each of the touch electrode rows R1-R6 includes a portion of the first touch electrodes 610 and the second touch electrodes 620 which are interleaved with each other. From another aspect, two sides of the first touch electrode 610 at the corner are adjacent to two second touch electrodes 620, two sides of the second touch electrode 620 at the corner are adjacent to two first touch electrodes 610, four sides of each of the other first touch electrodes 610 are adjacent to four second touch electrode 620s, and four sides of each of the other second touch electrode 620 are adjacent to four first touch electrodes 610. The first touch electrodes 610 are electrically connected to the first sensing lines 631 respectively, and the second touch electrodes are electrically connected to the second sensing lines 632 respectively.

The in-cell touch display device further includes multiple switches SW, a first touch testing pad 641, a second touch testing pad 642 and a switch control pad 650. Each touch electrode corresponds to one switch. The first touch electrodes 610 are electrically connected to the first touch testing pad 641 through the corresponding switches SW. The second touch electrodes 620 are electrically connected to the second touch testing pad 642 through the corresponding switches SW. To be specific, each switch SW has a control terminal, a first terminal and a second terminal. The switches SW are, for example, TFTs formed on the substrate, but the invention is not limited thereto. In the embodiment that the switches SW are TFTs, the first terminal is one of the source and drain of the TFT, the second terminal is the other one of the source and drain of the TFT, and the control terminal is the gate of the TFT. In other embodiments, the switches SW may be other components instead of TFT. In the embodiment, the switches SW (i.e. TFTs) and the TFTs in the pixel structures are formed by the same processes at the same time, but the invention is not limited thereto. The aforementioned control terminal is gate, the first terminal is one of source and drain, and the second terminal is the other one of source and drain. The switches SW include first switches SW1 and second switches SW2. The first terminals of the first switches SW1 are electrically connected to the first sensing lines 631, that is, electrically connected to the first touch electrodes 610. The first terminals of the second switches SW2 are electrically connected to the second sensing lines 632, that is, electrically connected to the second touch electrodes 620. The control terminals of the switches SW1 and SW2 are electrically connected to each other and are electrically connected to the switch control pad 650. The second terminals of the first switches SW1 are electrically connected to each other and are electrically connected to the first touch testing pad 641. The second terminals of the second switches SW2 are electrically connected to each other and are electrically connected to the second touch testing pad 642. For simplification, not all first switches SW1 and the second switches SW2 are labeled in FIG. 5.

FIG. 6 is a flow chart illustrating a testing method for the in-cell touch display device in accordance with an embodiment. FIG. 7A-FIG. 7D are schematic diagrams illustrating displayed images of the display device corresponding to the flow chart of FIG. 6. Referring to FIG. 6 and FIG. 7A-FIG. 7D, in step S701, a turn-on voltage is applied to the control terminals of the switches SW through the switch control pad 650, so as to turn on the switches SW. In the embodiment, the turn-on voltage is a high voltage, but the invention is not limited thereto. The level of the turn-on voltage is related to the type of the switches SW and a current-voltage curve of the switch SW. For example, when the switches SW are N-type transistors, the turn-on voltage is the high voltage; and when the switches SW are P-type transistors, the turn-on voltage is a low voltage. The level of the turn-on voltage is not limited in the invention.

Figure 7A:
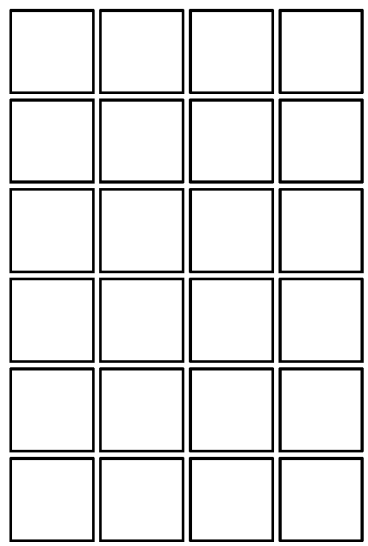
FIG. 7A-FIG. 7D are schematic diagrams illustrating displayed images of the display device corresponding to the flow chart of FIG. 6.
Figure 7B:
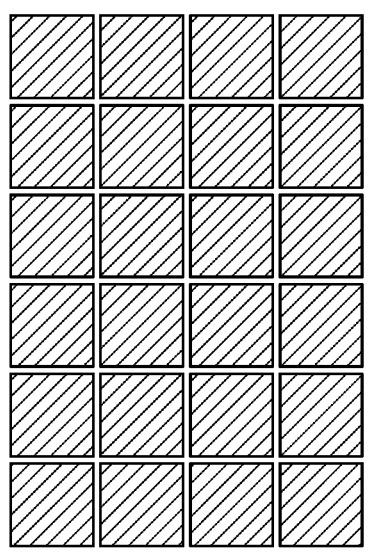

In step S702, a first voltage is applied to the second terminals of the first switches SW1 and the second terminals of the second switches SW2 through the first touch testing pad 641 and the second touch testing pad 642, so as to set a predetermined image of the in-cell touch display device as a full bright image (as shown in FIG. 7A), and it is determined whether the displayed image of the in-cell touch display device is identical to the predetermined full bright image. The first voltage may be the high voltage or the low voltage. The level of the first voltage is not limited in the invention. Since the switches SW are turned on in the step S701, when the first voltage is applied to the second terminals of the first switches SW1 and the second switches SW2, the first voltage is transmitted to the first touch electrodes 610 and the second touch electrodes 620, and the first touch electrodes 610 and the second touch electrodes 620 serve as common electrodes. On the other hand, since each touch electrode is constituted by more than one common electrodes, the voltage difference between the touch electrode (i.e. common electrode) and the pixel electrode rotates the liquid crystal when displaying an image. When the displayed image of the display device is not identical to the predetermined image (i.e. full bright image), it is determined that the sensing lines may be cut off and/or the electric connections between the sensing lines and the corresponding touch electrodes may be open so that the first voltage cannot be transmitted to the corresponding touch electrode to make the corresponding pixel to be in the full bright state.

In step S703, a second voltage is applied to the second terminals of the first switches SW1 and the second terminals of the second switches SW2 through the first touch testing pad 641 and the second touch testing pad 642, so as to set the predetermined image of the in-cell touch display device as a full dark image (shown in FIG. 7B), and it is determined whether the displayed image of the in-cell touch display device is identical to the predetermined full dark image. The second voltage is different from the first voltage of step S702. The second voltage is transmitted to the common electrodes so that the corresponding pixel is in the full dark state. Since all the pixels are expected to be in the dark state, the predetermined image is the full dark image. When the displayed image of the display device is not identical to the predetermined image (i.e. full dark image), it is determined that the sensing lines may be cut off and/or the electric connections between the sensing lines and the corresponding touch electrodes may be open so that the second voltage cannot be transmitted to the corresponding touch electrode to make the corresponding pixel to be in the full dark state.

Both of the step S702 and the step S703 are to determine if there is an open circuit on the sensing line or/and between the sensing line and the touch electrode. However, both of the step S702 and the step S703 are performed because if the open circuit occurs, the corresponding common electrode would be floating, causing the corresponding pixel to be dark or bright. If only one of the step S702 and the step S703 is performed, the open circuit may not be detected. For example, in the embodiment of FIG. 7A, if one common electrode is floating and the corresponding pixels are in the bright state, then the displayed image is still identical to the predetermined full bright image, resulting in that the open circuit may not be detected if only step 702 is performed.

Figure 7C:
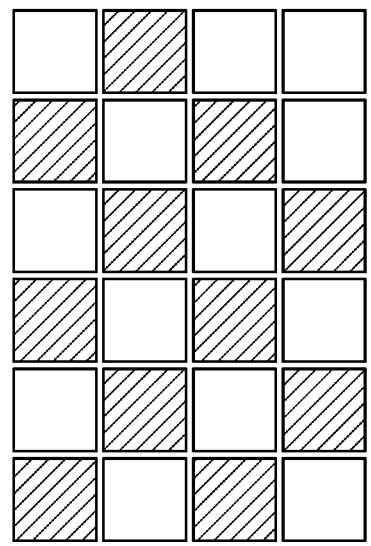

In step S704, a third voltage is applied to the second terminals of the first switches SW1 through the first touch testing pad 641, and a fourth voltage is applied to the second terminals of the second switches SW2 through the second touch testing pad 642. The third voltage is different from the fourth voltage so as to set the predetermined image of the in-cell touch display device as a first checkerboard image (as shown in FIG. 7C). In FIG. 7C, the pixels corresponding to the first touch electrodes 610 are in the bright state, and the pixels corresponding to the second touch electrode 620 are in the dark state. Still in the step S704, it is determined whether the displayed image of the in-cell touch display device is identical to the first checkerboard image. The third voltage is transmitted to the first touch electrodes 610 and the fourth voltage is transmitted to the second touch electrodes 620, and the first touch electrodes 610 are interleaved with the second touch electrodes 620, and therefore the predetermined image is the checkerboard image. In addition, when the displayed image of the in-cell touch display device is not identical to the predetermined image, it is determined that the adjacent sensing lines may be shorted and/or the adjacent touch electrodes may be shorted because when the short circuit occurs, the adjacent touch electrodes would have the same voltage, causing the corresponding pixels (one touch electrode includes more than one common electrodes of pixel structures) to be bright or dark and incapable of showing the checkerboard image.

Figure 7D:
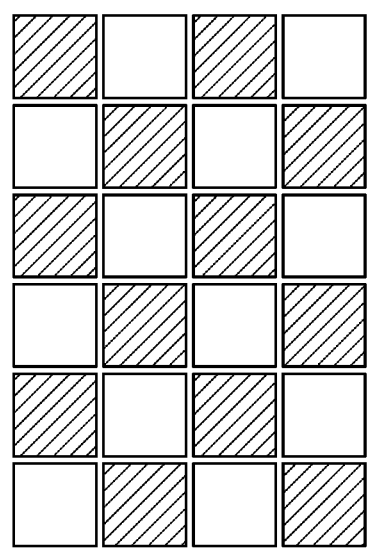

In step S705, a fifth voltage is applied to the second terminals of the first switches through the first touch testing pad 641, and a sixth voltage is applied to the second terminals of the second switches through the second touch testing pad 642. The fifth voltage is different from the sixth voltage so as to set the predetermined image of the in-cell touch display device as a second checkerboard image (as shown in FIG. 7D). In FIG. 7D, the pixels corresponding to the first touch electrodes 610 are in the dark state, and the pixels corresponding to the second touch electrodes 620 are in the bright state. Still in the step S705, it is determined whether the displayed image of the in-cell touch display device is identical to the predetermined second checkerboard image. When the displayed image of the in-cell touch display device is not identical to the predetermined image (i.e. the second checkerboard image), it is determined that the adjacent sensing lines may be shorted and/or the adjacent touch electrodes may be shorted with the same reason as that of the step S704.

In the embodiment of FIG. 7C, the third voltage is to set the corresponding pixels to be in the bright state, and the fourth voltage is configured to set the corresponding pixels to be in the dark state. In the embodiment of FIG. 7D, the fifth voltage is configured to set the corresponding pixels to be in the dark state, and the sixth voltage is configured to set the corresponding pixels to be in the bright state. However, the invention is not limited thereto. The configuration may be opposite in a way that the third voltage corresponds to a dark state, the fourth voltage corresponds to a bright state, the fifth voltage corresponds to the bright state, and the sixth voltage corresponds to the dark state. From another aspect, in some embodiments, when the third voltage is higher than the fourth voltage, the fifth voltage is lower than the sixth voltage; and when the third voltage is lower than the fourth voltage, the fifth voltage is higher than the sixth voltage.

Note that in the testing method of the invention, the aforementioned steps are not necessarily performed in the order from the step S702 to the S705. In other words, the order of the steps may be modified, and other steps may be inserted between the said steps. In addition, when the first to the sixth voltage are supplied to the second terminals of the first switches SW1 and the second terminals of the second switches SW2 through the first touch testing pad 641 and the second touch testing pad 642 in steps S702 to S705, the TFT and the pixel electrode of each pixel structure are turned on and supplied with a pixel voltage, respectively, such that the corresponding images are displayed.

Figure 8:
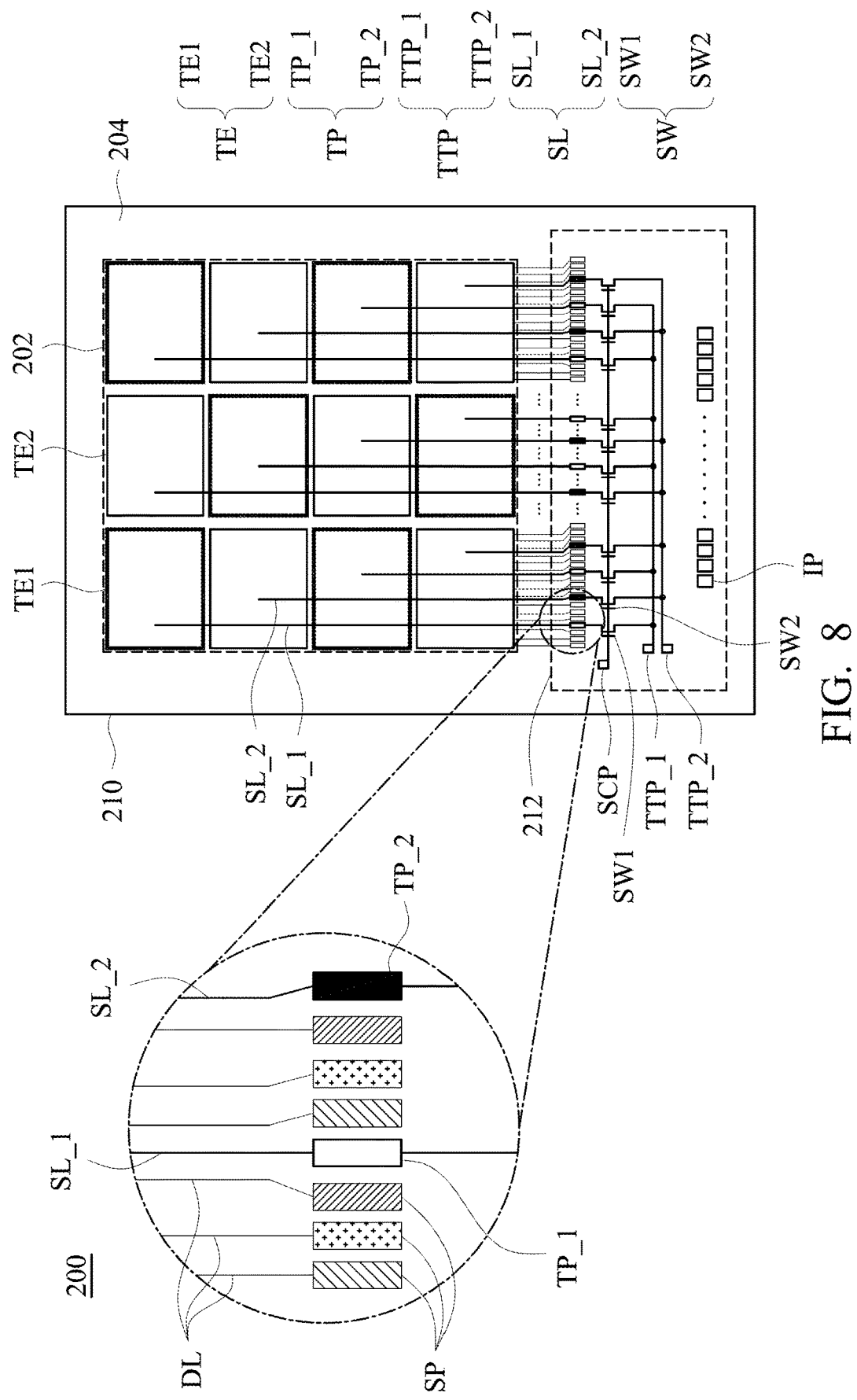
FIG. 8 is a schematic top view of an in-cell touch display device in accordance with a first embodiment.

FIG. 8 is a schematic top view of an in-cell touch display device in accordance with a first embodiment. An in-cell touch display device 200 has a display area 202 and a non-display area 204. A first substrate 210 includes a bonding area 212 in the non-display area 204. Data lines DL, touch pads TP, source pads SP, input pads IP, touch testing pads TTP, a switch control pad SCP and the switches SW are disposed on the first substrate 210. The touch pads TP, the source pads SP, the input pads IP and the switches SW are disposed in the bonding area 212. In the embodiment, sensing lines SL and touch electrodes TE are disposed on the first substrate 210 and between the first substrate 210 and a liquid crystal layer, but the invention is not limited thereto. In a varied embodiment, the sensing lines SL and the touch electrodes TE are disposed on a second substrate (not shown) opposite to the first substrate 210 and between the second substrate and the liquid crystal layer. The data lines DL are electrically connected to the source pads SP respectively. The input pads IP are configured to receive signals and/or power from a circuit board (not shown) which is electrically connected to the input pads IP. The touch electrodes TE include first touch electrodes TE_1 and second touch electrodes TE_2 which are interleaved with each other and are electrically connected to the first sensing lines SL_1 and the second sensing lines SL_2 respectively. The first sensing lines SL_1 and the second sensing lines SL_2 are electrically connected to the first touch pads TP_1 and the second touch pads TP_2 respectively. Note that the edges of the first touch electrodes TE_1 are illustrated as bold lines in FIG. 8 and in the following figures in order to discriminate between the first touch electrodes TE_1 and the second touch electrodes TE_2 in the figures. In addition, the first terminals of the first switches SW1 are electrically connected to the first touch pads TP_1, that is, the first terminals of the first switches SW1 are electrically connected to the first sensing lines SL_1 respectively. The second terminal of the first switches SW1 are electrically connected to each other and are electrically connected to the first touch testing pad TTP_1. The first terminals of the second switches SW2 are electrically connected to the second touch pads TP_2, that is, the first terminals of the second switches SW2 are electrically connected to the second sensing line SL_2. The second terminals of the second switches SW2 are electrically connected to each other and are electrically connected to the second touch testing pad TTP_2. The control terminals of the first switches SW1 and the second switches SW2 are electrically connected to the switch control pad SCP. Note that only a portion of the data lines DL and the source pads SP are shown in FIG. 8 for simplification. For example, only the data lines DL and the source pads SP at two sides of the in-cell touch display device 200 are shown in FIG. 8, and the data lines DL and the source pads SP in the middle are omitted. The in-cell touch display device 200 is tested and abnormal points are located to quickly find the reason of the abnormality by the configuration of the in-cell touch display device 200 with the testing method of FIG. 6 to FIG. 7D.

Figure 9A:
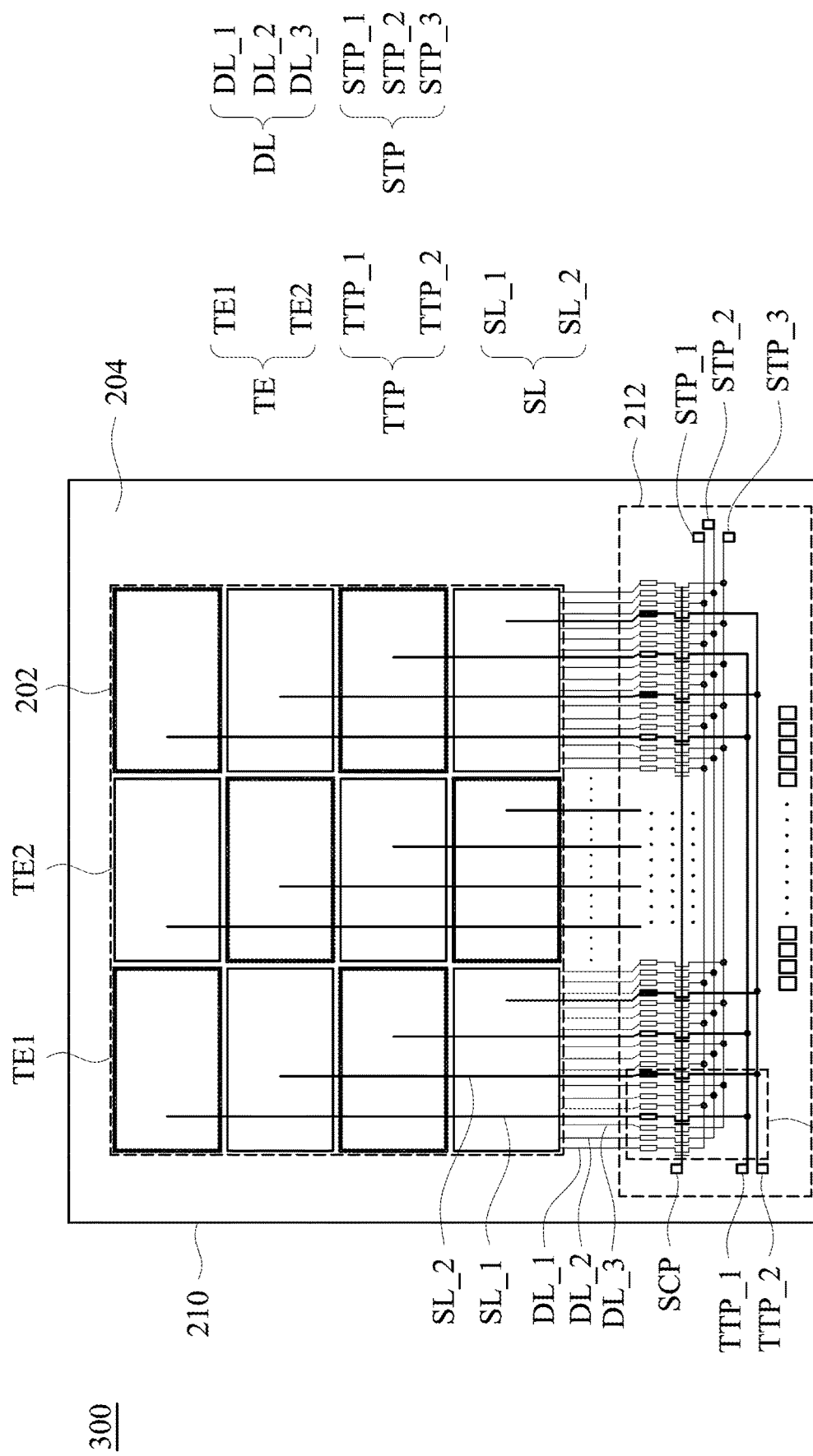
FIG. 9A is a schematic top view of an in-cell touch display device in accordance with a second embodiment.
Figure 9B:
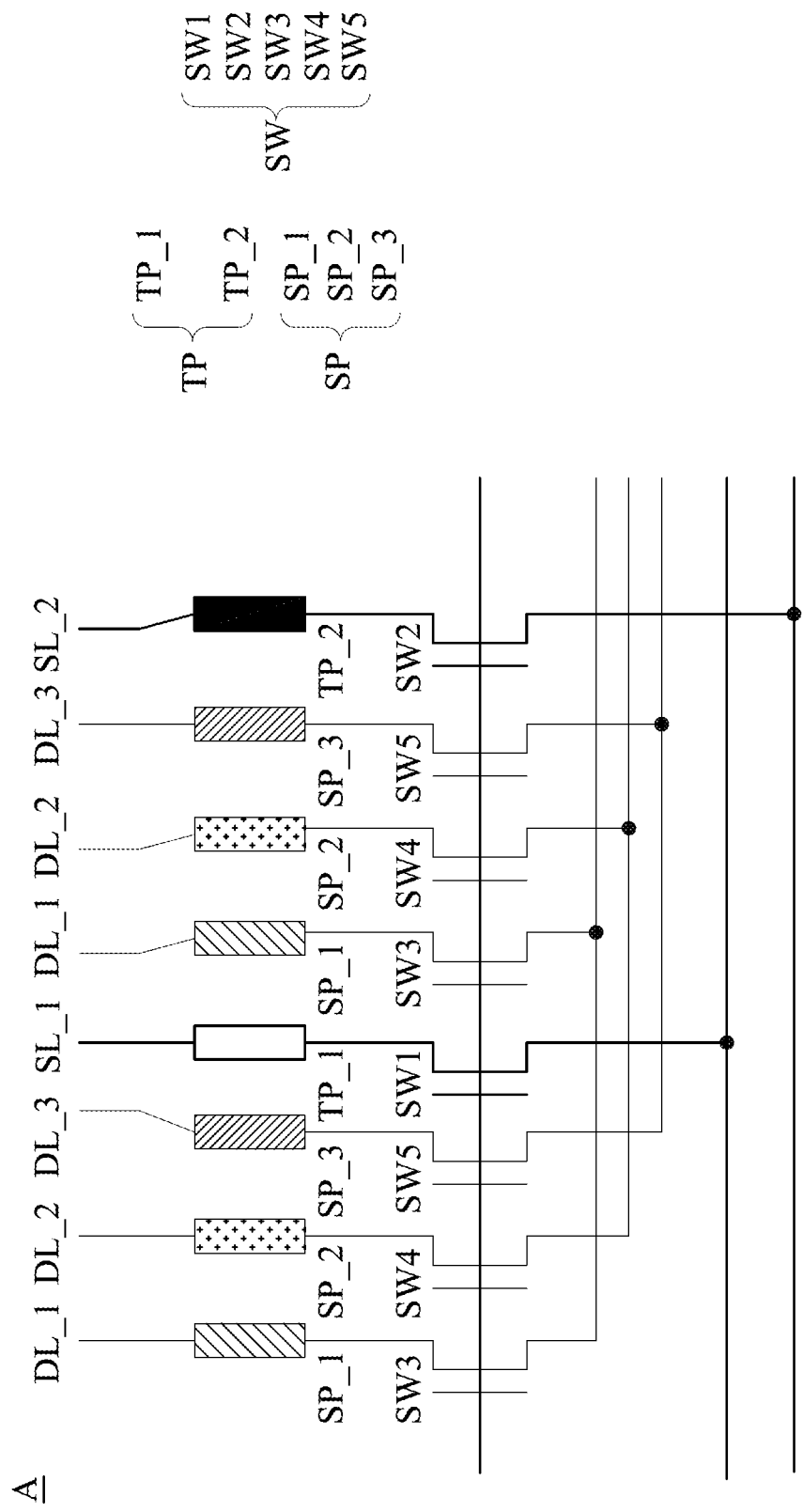
FIG. 9B is an enlarged diagram of an area A of FIG. 9A.
Figure 10:
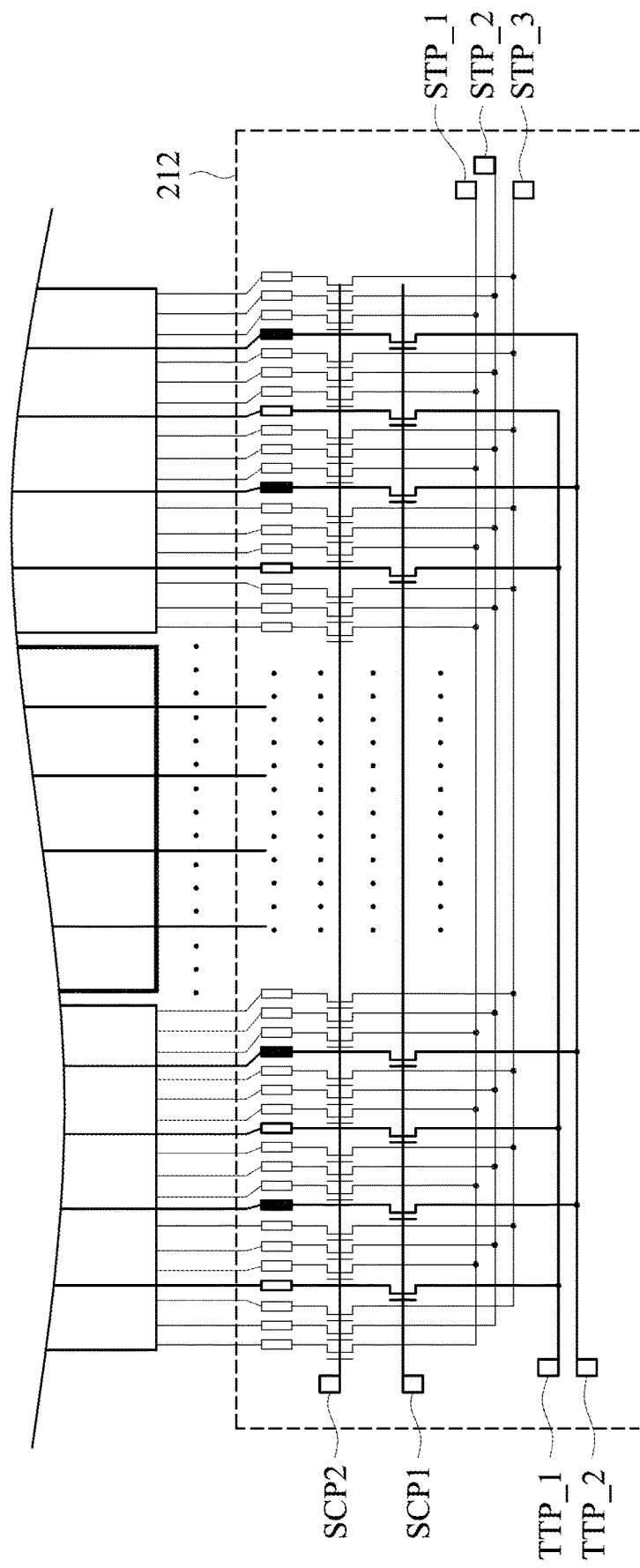
FIG. 10 is a schematic top view of a portion of an in-cell touch display device in accordance with another embodiment.

Referring to FIG. 9A and FIG. 9B, FIG. 9A is a schematic top view of an in-cell touch display device in accordance with a second embodiment, and FIG. 9B is an enlarged diagram of an area A of FIG. 9A. The difference between FIG. 9A and FIG. 8 is that an in-cell touch display device 300 of FIG. 9A further includes source testing pads STP disposed on the first substrate 210, and the switches SW further include third to fifth switches SW3-SW5. In addition, the source pads SP are divided into three groups and the data lines DL are also divided into three corresponding groups. To be specific, the source pads SP includes first source pads SP_1, second source pads SP_2 and third source pads SP_3 which are electrically connected to the first data lines DL_1, the second data lines L_2 and the third data lines DL_3 respectively. For example, the first to third source pads SP_1-SP_3 are electrically connected to the pixel structures with different colors in the in-cell touch display device, but the invention is not limited thereto. For simplification, the pixel structures are not shown in FIG. 9A, and a portion of the data lines DL, the touch pads TP, the source pads SP and the switches SW are omitted in FIG. 9A. As shown in FIG. 9A, the source testing pads STP include a first source testing pad STP_1 to a third source testing pad STP_3. The first terminals of the third switches SW3 are electrically connected to the first source pads SP_1, that is, the first terminals of the third switches SW3 are electrically connected to the first data lines DL_1 respectively. The second terminals of the third switches SW3 are electrically connected to each other and are electrically connected to the first source testing pad STP_1. The first terminals of the fourth switches SW4 are electrically connected to the second source pads SP_2, that is, the first terminals of the fourth switches SW4 are electrically connected to the second data lines DL_2 respectively. The second terminals of the fourth switches SW4 are electrically connected to each other and are electrically connected to the second source testing pad STP_2. The first terminals of the fifth switches SW5 are electrically connected to the third source pads SP_3, that is, the first terminals of the fifth switches SW5 are electrically connected to the third data lines DL_3 respectively. The second terminals of the fifth switches SW5 are electrically connected to each other and are electrically connected to the third source testing pad STP_3. In FIG. 9A, the control terminals of the first to fifth switches SW1-SW5 are all electrically connected to the switch control pad SCP, but the invention is not limited thereto. Referring to FIG. 10, FIG. 10 is a varied embodiment of FIG. 9A, and only part of the in-cell touch display device is shown. The difference between FIG. 10 and FIG. 9A is that in FIG. 10, the control terminals of the first switches SW1 and the second switches SW2 are electrically connected to a switch control pad SCP1, and the control terminals of the third to fifth switches SW3-SW5 are electrically connected to another switch control pad SCP2. The remaining part of FIG. 10 is similar to FIG. 9A, and therefore it will not be described again.

The first to third source testing pads STP_1-STP_3 are configured to test if the data lines are shorted or open, and to test if the coupling between the data lines and the TFTs are normal, but the invention is not limited thereto. For example, a turn-on voltage (e.g. a high voltage) is applied to the switch control pad SCP to turn on the switches SW, and identical or different voltages are applied to the first to third source testing pads STP_1-STP_3 respectively. The in-cell touch display device would display a corresponding image in accordance with the voltages applied to the first to third source testing pads STP_1-STP_3. Whether the data lines DL are abnormal is determined and the abnormal location is identified by determining if the displayed image of the in-cell touch display device is identical to the predetermined image. As a result, the in-cell touch display device 300 is tested completely, the abnormality is located, and the root cause of the abnormality is quickly identified by the configuration and the testing method for the data lines with the configuration and the testing method for the touch electrode of FIG. 8.

Figure 11A:
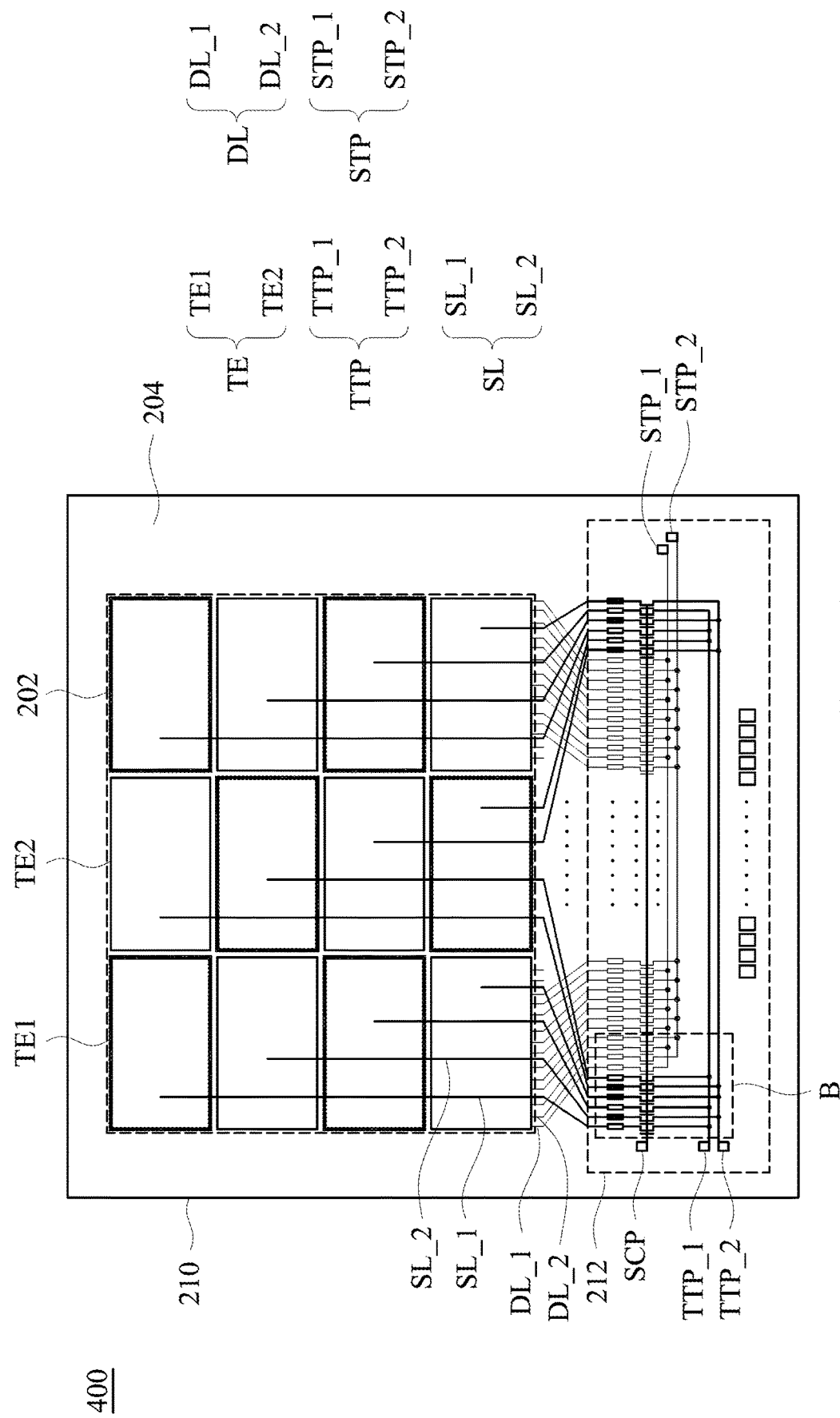
FIG. 11A is a schematic top view of an in-cell touch display device in accordance with a third embodiment.
Figure 11B:
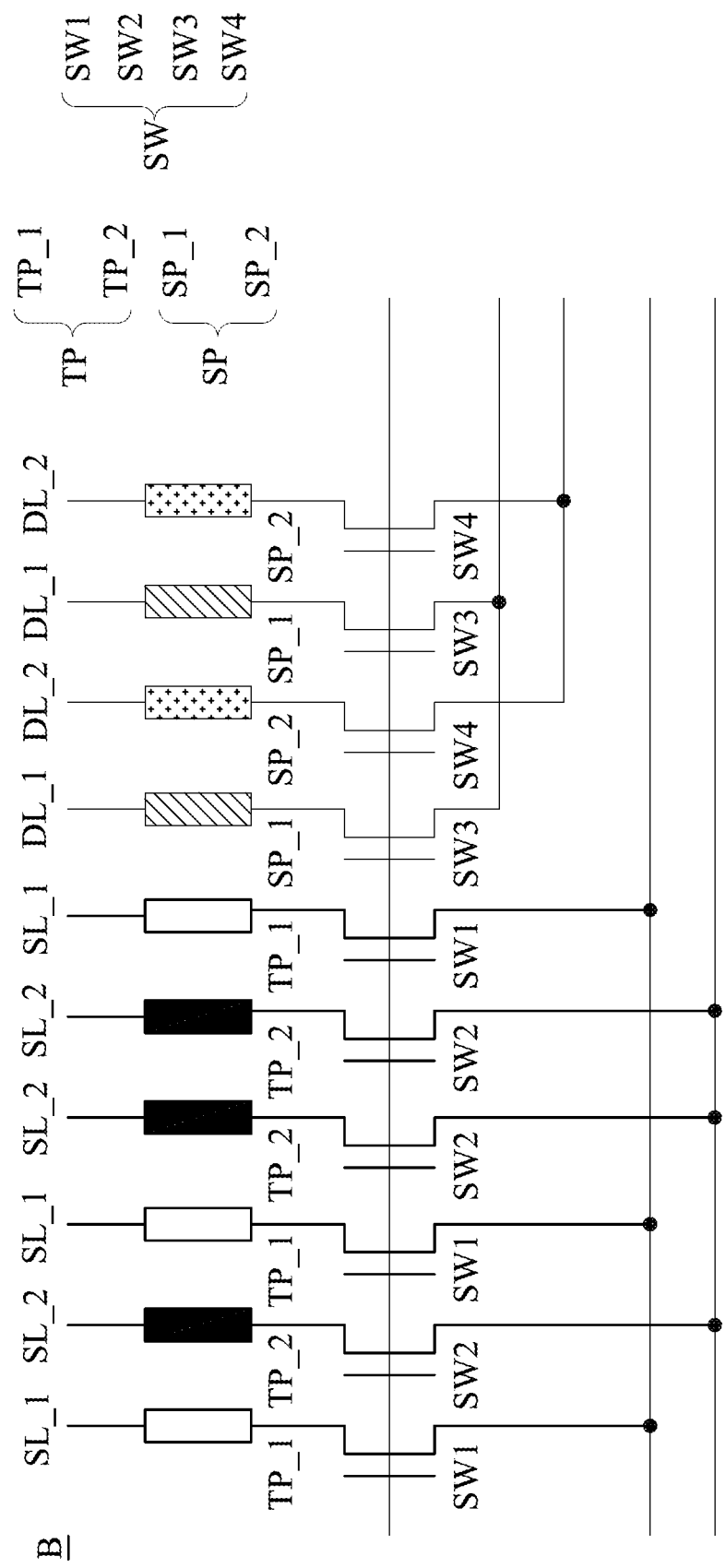
FIG. 11B is an enlarged diagram of an area B of FIG. 11A.

Referring to FIG. 11A and FIG. 11B, FIG. 11A is a schematic top view of an in-cell touch display device in accordance with a third embodiment. FIG. 11B is an enlarged diagram of an area B of FIG. 11A. For simplification, a portion of the data lines DL, the source pads SP and the switches SW are omitted in FIG. 11. The difference between FIG. 11A and FIG. 8 is that in FIG. 11A, an in-cell touch display device 400 further includes source testing pads STP disposed on the first substrate 210, and the switches SW further include third switches SW3 and fourth switches SW4. In addition, the source pads SP are divided into two groups and the data lines DL are divided into two corresponding groups. To be specific, the source pads SP include first source pads SP_1 and second source pads SP_2 which are electrically connected to the first data lines DL_1 and the second data lines DL_2 respectively. For example, the first data lines DL_1 are odd data lines, and the second data lines DL_2 are even data lines. In other words, the first data lines DL_1 are interleaved with the second data lines DL_2 in the display area 202, but the invention is not limited thereto. As shown in FIG. 11A, the source testing pads STP include a first source testing pad STP_1 and a second source testing pad STP_2. The first terminals of the third switches SW3 are electrically connected to the first source pad SP_1 respectively. The second terminals of the third switches SW3 are electrically connected to each other and are electrically connected to the first source testing pad STP_1. The first terminals of the fourth switches SW4 are electrically connected to the second source pad SP_2 respectively. The second terminals of the fourth switches SW4 are electrically connected to each other and are electrically connected to the second source testing pad STP_2. In FIG. 11A, the control terminals of the first to fourth switches SW1-SW4 are all electrically connected to the switch control pad SCP, but the invention is not limited thereto. Similarly, in a varied embodiment, the control terminals of the first switches SW1 and the second switches SW2 are electrically connected to a switch control pad, and the control terminals of the third switches SW3 and the fourth switches SW4 are electrically connected to another switch control pad.

The first source testing pad STP_1 and the second source testing pad STP_2 are configured to test if the data lines are shorted or open, and to test if the coupling between the data lines and the TFTs is normal so as to determine whether and where the data lines DL are abnormal. As a result, the in-cell touch display device is tested completely, the abnormality is located, and the root cause of the abnormality is quickly identified by the configuration and the testing method of the data lines with the configuration and the testing method of the touch electrodes of FIG. 8.

Figure 12:
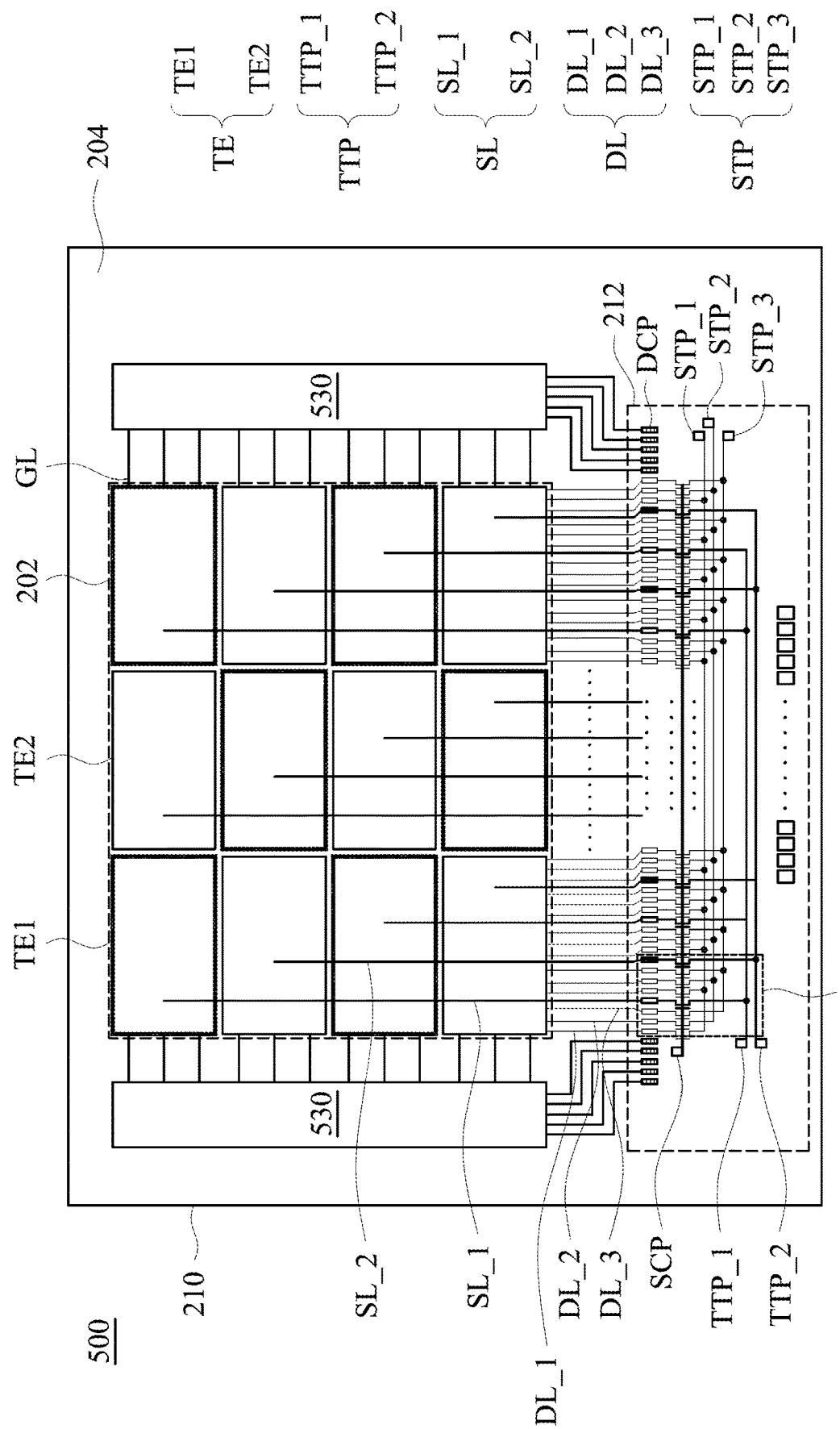
FIG. 12 is a schematic top view of an in-cell touch display device in accordance with a fourth embodiment.

Referring to FIG. 12, FIG. 12 is a schematic top view of an in-cell touch display device in accordance with a fourth embodiment. For simplification, a portion of the data line DL, the touch pads TP, the source pads SP and the switches SW are omitted in FIG. 12. The difference between FIG. 12 and FIG. 9A is that in FIG. 12, gate lines GL of an in-cell touch display device 500 are shown, and the in-cell touch display device 500 further includes gate driving circuits 530 and driving circuit pads DCP. The gate driving circuits 530 are disposed on the first substrate 210, and are electrically connected to the gate lines GL and the driving circuit pads DCP. The gate driving circuits 530 include multiple stages of shift registers which generate and output scan signals to the gate lines GL respectively. In the embodiment, the TFTs in the gate driving circuits 530 and the TFTs in the pixel structures are formed by the same processes at the same time. That is, a structure of Gate Driver on Array (GOA) is adopted. Multiple driving circuit controlling signals which are inputted to the driving circuit pads DCP include clock signals and/or other input signals (e.g. start-up signal and end signal), which are not limited in the invention, to control the gate driving circuits 530. The remaining part of FIG. 12 is similar to that of FIG. 9A, and the enlarged diagram of the area A of FIG. 12 is identical to FIG. 9B, and therefore they will not be described again.

Figure 13A:
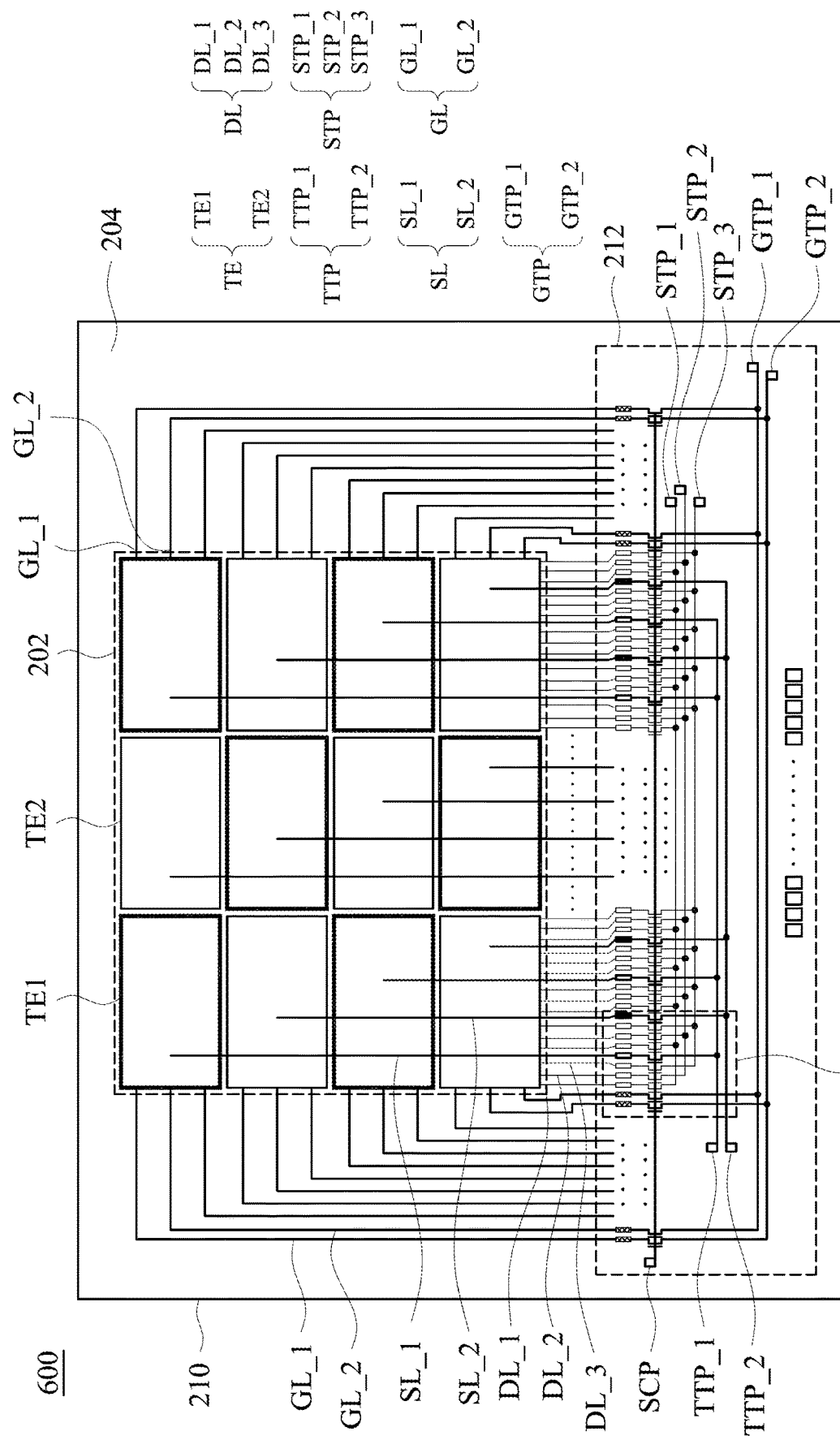
FIG. 13A is a schematic top view of an in-cell touch display device in accordance with a fifth embodiment.
Figure 13B:
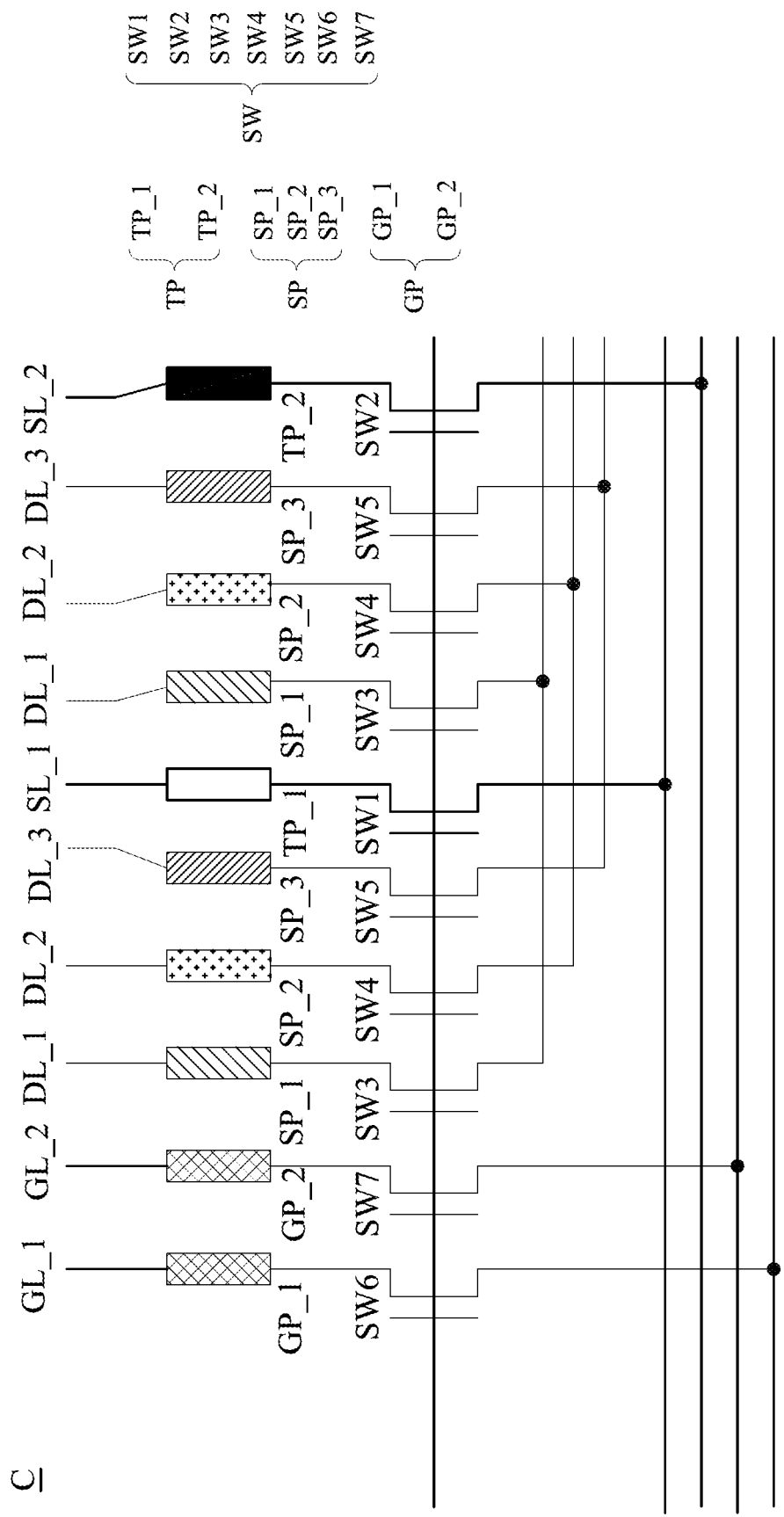
FIG. 13B is an enlarged diagram of an area C of FIG. 13A.

Referring to FIGS. 13A and 13B, FIG. 13A is a schematic top view of an in-cell touch display device in accordance with a fifth embodiment, and FIG. 13B is an enlarged diagram of an area C of FIG. 13A. For simplification, a portion of the data lines DL, the touch pads TP, the source pads SP, gate pads GP and the switches SW are omitted in FIG. 13A. The difference between FIG. 13A and FIG. 9A is that, in FIG. 13A, the gate lines GL of an in-cell touch display device 600 are shown, and the in-cell touch display device 600 further includes gate pads GP and gate testing pads GTP. The gate pads GP include first gate pads GP_1 and second gate pads GP_2. The gate testing pads GTP include a first gate testing pad GTP_1 and a second gate testing pad GTP_2. The switches SW further include sixth switches SW6 and seventh switches SW7. The first gate pads GP_1 and the second gate pads GP_2 are electrically connected to the first gate line GL_1 and the second gate line GL_2 respectively. For example, the first gate lines GL_1 are odd gate lines, and the second gate lines GL_2 are even gate lines. That is, the first gate lines GL_1 are interleaved with the second gate lines GL_2 in the display area 202, but the invention is not limited thereto. The first terminals of the sixth switches SW6 are electrically connected to the first gate pads GP_1, that is, the first terminals of the sixth switches SW6 are electrically connected to first gate lines GL_1 respectively. The second terminals of the sixth switches SW6 are electrically connected to the first gate testing pad GTP_1. The first terminals of the seventh switches SW7 are electrically connected to the second gate pads GP_2, that is, the first terminals of the seventh switches SW7 are electrically connected to the second gate lines GL_2 respectively. The second terminals of the seventh switches SW7 are electrically connected to the second gate testing pad GTP_2. Note that for simplification, only a portion of the gate lines GL are shown in FIG. 13A in which the gate lines GL extend to the bonding area 212 to be electrically connected to the gate pads GP and the switches SW. For example, only two gate lines (i.e. first gate line GL_1 and second gate line GL_2) above and two gate lines (i.e. first gate line GL_1 and second gate line GL_2) below are shown in FIG. 13A and they extend to the bonding area 212 to be electrically connected to the first gate pads GP_1 and the second gate pads GP_2. Moreover, the first gate pads GP_1 and the second gate pads GP_2 are electrically connected to the sixth switches SW6 and the seventh switches SW7 respectively. Remaining part of the gate lines GL, the first gate pads GP_1, the second gate testing pads GTP_2, the sixth switches SW6 and the seventh switches SW7 are omitted. In FIG. 13A, the control terminals of the first to seventh switches SW1-SW7 are electrically connected to the switch control pad SCP, but the invention is not limited thereto.

The first gate testing pad GTP_1 and the second gate testing pad GTP_2 are configured to test if the gate lines GL are short or open, and to test if the coupling between the gate lines GL and the TFTs are normal, but the invention is not limited thereto. For example, the turn-on voltage is applied to the switch control pad SCP to turn on the switches SW; identical or different voltages are applied to the first to third source testing pads STP_1-STP_3 respectively; and identical or different voltages are applied to the first gate testing pad GTP_1 and the second gate testing pad GTP_2 respectively. The in-cell touch display device 600 would have a predetermined image in accordance with the voltages applied to the first to the third source testing pads STP_1-STP_3 and the first to second gate testing pads GTP_1 and GTP_2. Whether and where the data lines DL and the gate lines GL are abnormal are detected by determining if the displayed image of the in-cell touch display device 600 is identical to the predetermined image. As a result, the in-cell touch display device 600 is tested completely, the abnormality is located, and the root cause of the abnormality is quickly identified by the configuration and the testing method of the data lines and the gate lines with the configuration and the testing method of the touch electrodes of FIG. 8. Note that the test structure for the gate lines in FIG. 13A may be applied to the embodiment of FIG. 11A, and it will not be described again. In addition, the switch control pads SCP in FIG. 8, FIG. 9A, FIG. 11A, FIG. 12 and FIG. 13A and the switch control pads SCP1 and SCP2 in FIG. 10 are disposed in the bonding area 212, but the invention is not limited thereto. In varied embodiments, the switch control pad SCP in FIG. 8, FIG. 9A, FIG. 11A, FIG. 12 or FIG. 13A is disposed outside the bonding area 212 and at least one of the switch control pads SCP1 and SCP2 in FIG. 10 is disposed outside the bonding area 212.

Figure 14A:
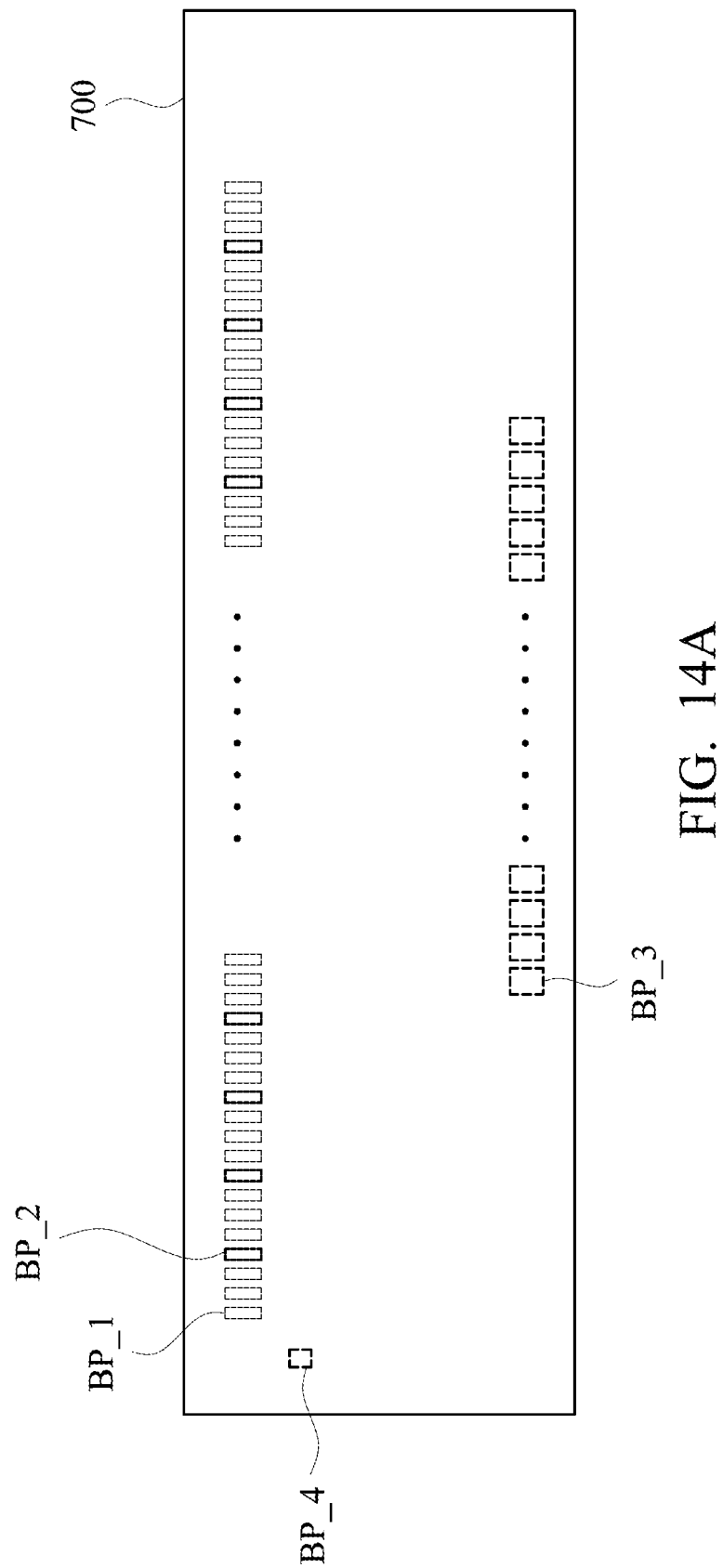
FIG. 14A is a schematic top view of an integrated circuit chip.
Figure 14B:
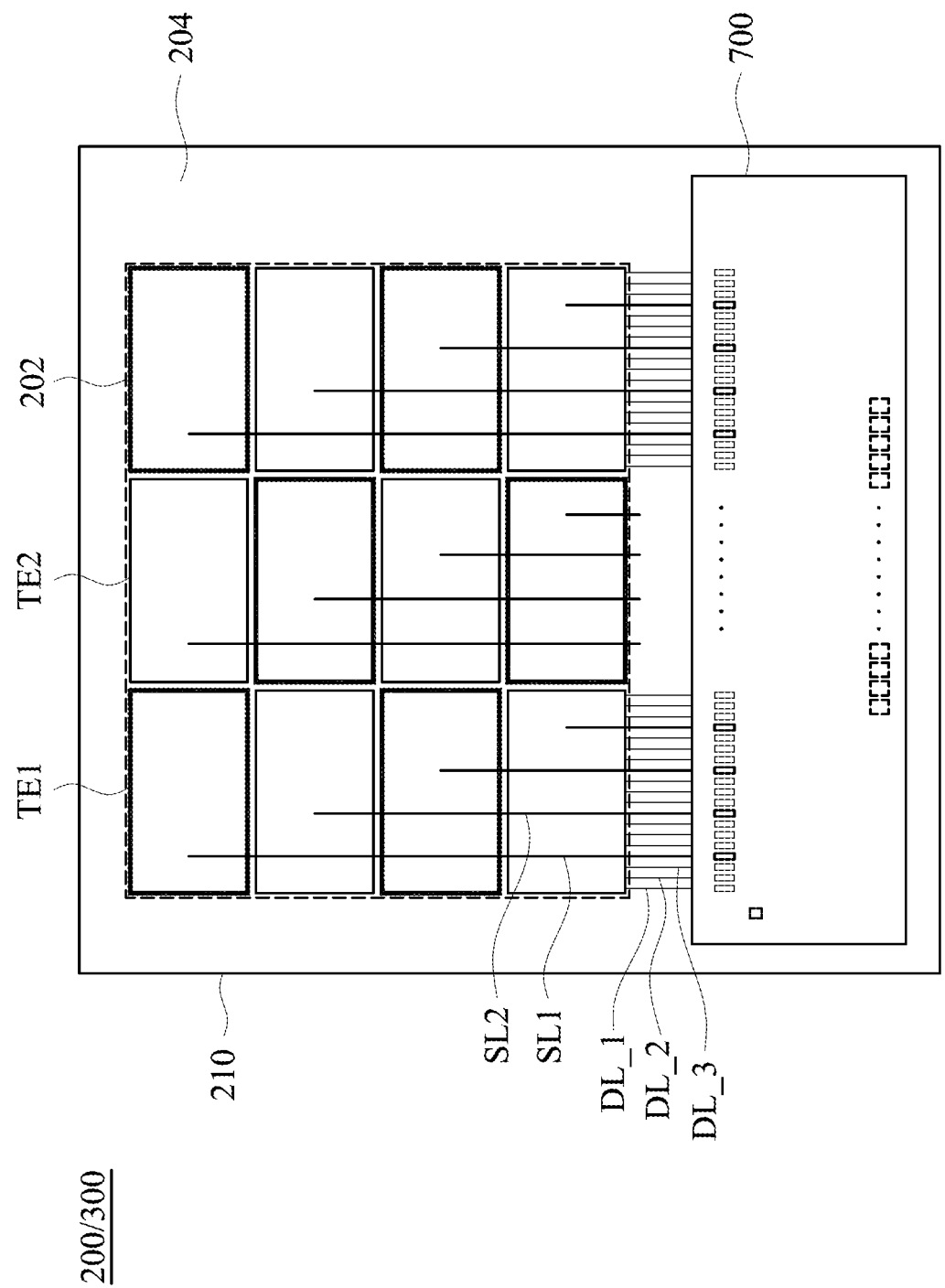
FIG. 14B is a schematic top view in which an integrated circuit chip is disposed on a first substrate after the testing method described in FIG. 8

Referring to FIG. 14A and FIG. 14B, FIG. 14A is a schematic top view of an integrated circuit chip, and FIG. 14B is a schematic diagram illustrating a top view of the disposition of the integrated circuit chip on the first substrate 210 after the testing method described in FIG. 8 or FIG. 9A is performed. As shown in FIG. 14A, an integrated circuit chip 700 includes a source driving circuit and a touch sensing circuit, but the invention is not limited thereto. In other embodiments, the integrated circuit chip 700 may further include a gate driving circuit or other circuits. The integrated circuit chip 700 includes multiple bonding pads BP including first bonding pads (also referred to as source bonding pads) BP_1, second bonding pads (also referred to as touch bonding pads) BP_2 and third bonding pads (also referred to as input bonding pads) BP_3. The first bonding pads BP_1 are configured to be electrically connected to the source pads SP. The second bonding pads BP_2 are configured to be electrically connected to the touch pads TP. The third bonding pads BP_3 are configured to be electrically connected to the input pads IP. As shown in FIG. 14B, when the integrated circuit chip 700 is disposed in the bonding area 212 of the first substrate 210, the first bonding pads BP_1 are electrically connected to the source pads SP, the second bonding pads BP_2 are electrically connected to the touch pads TP, and the third bonding pads BP_3 are electrically connected to the input pads IP. Therefore, the integrated circuit chip 700 can transmit data signals to the data lines DL through the first bonding pads BP_1 and the source pads SP, and transmit and/or receive touch signals through the second bonding pads BP_2 and the touch pads TP. Note that in the embodiment of FIG. 14A and FIG. 14B, the integrated circuit chip 700 includes the source bonding pads BP_1, the touch bonding pads BP_2 and the input bonding pads BP_3 respectively corresponding to the source pads SP, the touch pads TP and the input pads IP disposed on the first substrate 210, but the invention is not limited thereto. In another embodiment, the integrated circuit chip 700 may further include a gate driving circuit and multiple bonding pads corresponding to the gate pads GP in FIG. 13A and FIG. 13B. In yet another embodiment, the integrated circuit chip 700 may further include multiple bonding pads corresponding to the driving circuit pads DCP in FIG. 12 such that multiple driving circuit controlling signals are provided to the gate driving circuit 530 in FIG. 12 through the driving circuit pads DCP. In addition, in varied embodiments, the locations of the source bonding pads BP_1 and the touch bonding pads BP_2 of the integrated circuit chip 700 may be respectively corresponding to the locations of the source pads SP and the touch pads TP in FIG. 11A and FIG. 11B.

In the embodiment that the touch electrodes TE serve as common electrodes of pixel structures in the display period, a frame period is divided into at least one display period and at least one touch sensing period. In a first time period (also referred to as a display period), the touch electrodes TE serve as common electrodes to display an image. Therefore, the touch pads TP and the sensing lines SL electrically connected to touch electrodes TE are used to input a common voltage while pixel data is transmitted to the pixel electrode of the pixel structures through the data lines DL for displaying an image. In a second time period (also referred to as a touch sensing period), the touch electrodes TE are used for touch sensing. Therefore, the touch pads TP and the sensing lines SL are used to transmit and/or receive the touch signals. Note that after the testing methods for the data lines and the touch electrodes in the embodiments above are performed, the switches SW have to be turned off to prevent the touch and display functions of the in-cell touch display device from being affected by the noises through the touch testing pad TTP and/or the source testing pad STP. Accordingly, after the tests are performed, the switch control pads SCP in FIG. 8, FIG. 9A, FIG. 11A, FIG. 12 or FIG. 13A or the switch control pads SCP1 and SCP2 in FIG. 10 are electrically connected to a turn-off voltage to turn off the switches SW. In the embodiment, the turn-off voltage is a gate low voltage (VGL), but the invention is not limited thereto. The turn-off voltage may be provided by the integrated circuit chip 700, but the invention is not limited thereto. For example, as shown in FIG. 14A and FIG. 14B, the bonding pads of the integrated circuit chip 700 further include a fourth bonding pad BP_4 (also referred to as switch control bonding pad) for providing the turn-off voltage (e.g. the VGL). For example, the integrated circuit chip 700 may include at least one VGL pad, and one of the at least one VGL pad serves as the switch control bonding pad BP_4, but the invention is not limited thereto. When the integrated circuit chip 700 is disposed in the bonding area 212, the locations of the fourth bonding pad BP_4 corresponds to the location of the switch control pad SCP, and the fourth bonding pad BP_4 is electrically connected to the switch control pads SCP for providing the turn-off voltage to the switch control pad SCP to turn off the switches SW, but the invention is not limited thereto. In a varied embodiment, the location of the fourth bonding pad BP_4 does not correspond to the location of the switch control pad SCP, instead, the fourth bonding pad BP_4 corresponds and is electrically connected to an additional pad on the first substrate 210. The switch control pad SCP is electrically connected to the additional pad through a conductive line on the first substrate 210, and by this way, the turn-off voltage is applied to the switch control pad SCP. In the embodiment of FIG. 14B, the integrated circuit chip 700 is disposed on the first substrate 210, but the invention is not limited thereto. In some varied embodiments, the integrated circuit chip 700 is disposed on a circuit board and the turn-off voltage applied to the switch control pad SCP is provided by the integrated circuit chip 700. For example, the circuit board may be a Printed Circuit Board (PCB) or a flexible printed circuit board (FPC) which is electrically connected to multiple bonding pins disposed on the first substrate 210, and at least one of the bonding pins is electrically connected to the switch control pad SCP, such that the turn-off voltage applied to the switch control pad SCP is provided by the integrated circuit chip 700, which is not limited in the invention. In other varied embodiments, the integrated circuit chip 700 is disposed on the first substrate 210, and another integrated circuit chip capable of outputting the turn-off voltage is further disposed on the first substrate 210 or a circuit board, and the turn-off voltage applied to the switch control pad SCP is provided by the another integrated circuit chip. For example, the another integrated circuit chip may be a power chip or a chip including a power supply circuit capable of outputting the turn-off voltage, but the invention is not limited thereto.

In FIG. 8 and FIG. 9A, the source testing pads STP, the touch testing pads TTP, and the switch control pads SCP are all in the bonding area 212, but the invention is not limited thereto. In a varied embodiment, at least a portion of the source testing pads STP, the touch testing pads TTP, and the switch control pads SCP are disposed in the non-display area 204 outside the bonding area 212.

As described above, when the in-cell touch display device of the invention is tested, the integrated circuit chip 700 is not electrically connected to the touch pads TP and the source pads SP on the first substrate 210 yet. After the in-cell touch display device is tested, the integrated circuit chip 700 is disposed in the bonding area 212 of the first substrate 210, that is, the integrated circuit chip 700 is electrically connected to the touch pads TP and the source pads SP on the first substrate 210. After the tests are performed, the switch control pad is electrically connected to the turn-off voltage to turn off all the switches SW in order to prevent the function and vision performance of the in-cell touch display device being affected by noises transmitted from the source testing pads STP and the touch testing pads TTP. The turn-off voltage may be provided by the integrated circuit chip 700, or by a circuit board which is electrically connected to the in-cell touch display device. Compared with prior art in which additional processes are required to cut off related testing units (e.g. switches) after a testing procedure is performed to avoid the noises, in the present invention, the switches SW are turned off by the integrated circuit chip or the circuit board after the testing procedure is performed. Accordingly, no additional process is required after the test to avoid the noises.

In FIG. 14A, the locations of the first bonding pads BP_1 and the second bonding pads BP_2 of the integrated circuit chip 700 correspond to that of the source pads SP and the touch pads GP of FIG. 8 and FIG. 9A. In other embodiments, the locations the first bonding pads BP_1 and the second bonding pads BP_2 of the integrated circuit chip 700 correspond to that of the source pads SP and the touch pads GP of FIG. 11A, and the integrated circuit chip 700 is disposed in the bonding area 212 of the first substrate 210 of FIG. 11A after the testing method for the in-cell touch display device is performed. In another embodiment, the bonding pads BP of the integrated circuit chip 700 include bonding pads corresponding to the driving circuit pads DCP of FIG. 12, and the integrated circuit chip 700 is disposed in the bonding area 212 of the first substrate 210 of FIG. 12 so as to be electrically connected to the driving circuit pad DCP after the testing method for the in-cell touch display device is performed, and then driving circuit controlling signals are transmitted to the gate driving circuits 530 to control the gate driving circuits 530. In yet another embodiment, the bonding pads BP of the integrated circuit chip 700 further include bonding pads corresponding to the gate pads GP of FIG. 13A, and the integrated circuit chip 700 is disposed in the bonding area 212 of the first substrate 210 of FIG. 13A so as to be electrically connected to the gate pads GP after the testing method for the in-cell touch display device is performed, and then the scan signals are transmitted to the corresponding gate lines GL.

Figure 15:
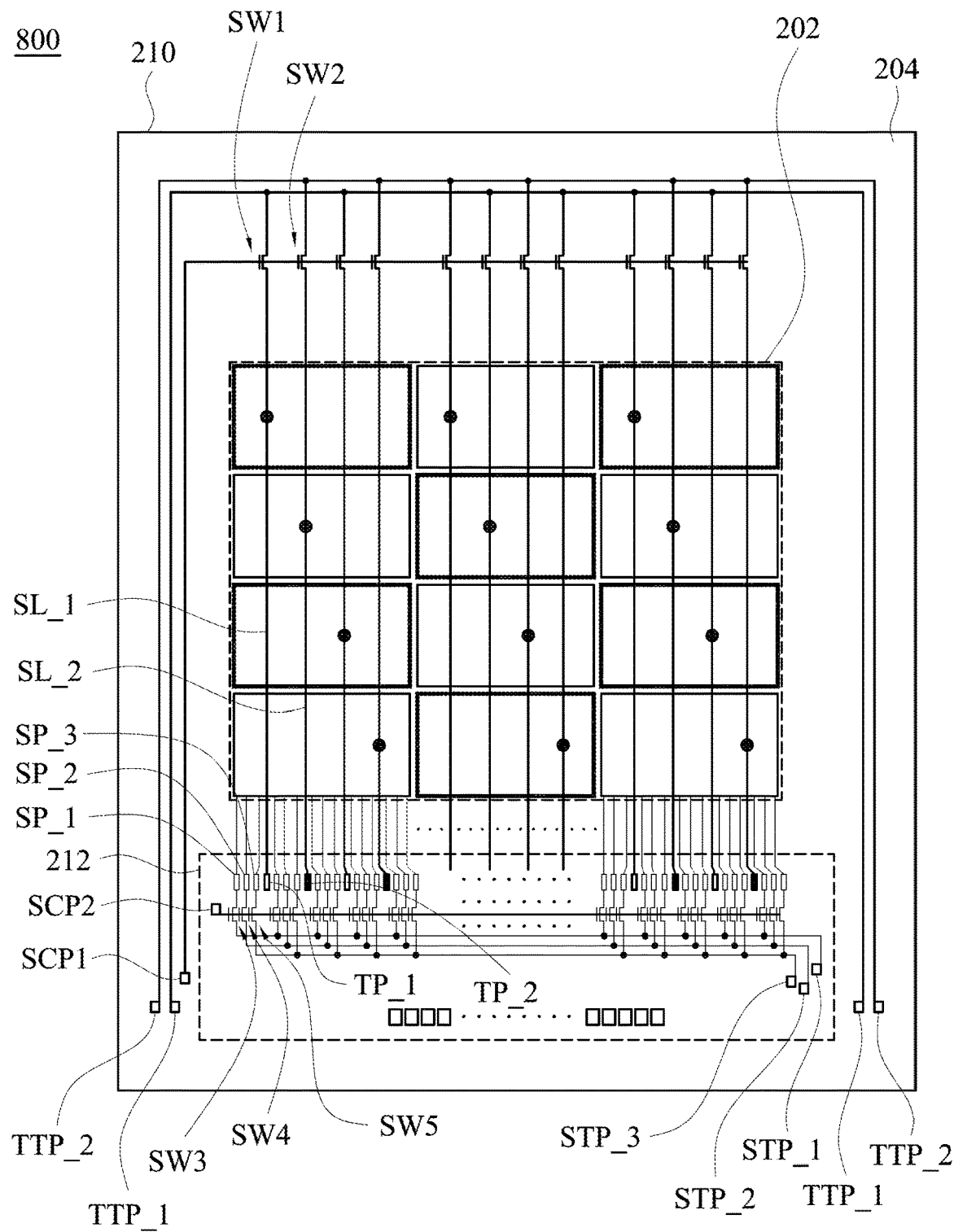
FIG. 15 is a schematic top view of an in-cell touch display device in accordance with a sixth embodiment.

Referring to FIG. 15, FIG. 15 is a schematic top view of an in-cell touch display device in accordance with a sixth embodiment. In the embodiment of FIG. 9A and FIG. 9B, the first to fifth switches SW1-SW5 are disposed in space of the bonding area 212 that does not have pads. However, the number of the switches SW increases while the resolution of the in-cell touch display device increases, and therefore the bonding area 212 may not be able to accommodate all the switches SW. The difference between FIG. 15 and FIG. 9A is that in an in-cell touch display device 800 of FIG. 15, the third to fifth switches SW3-SW5, which are electrically connected to the data lines DL_1-DL_3, are disposed in the bonding area 212 of the non-display area 204 below the display area 202, and the first to second switches SW1, SW2, which are electrically connected to the touch electrodes TE1 and TE2, are disposed in the non-display area 204 above the display area 212 when viewed in a direction perpendicular to the first substrate 210. In addition, the control terminals of the first and second switches SW1, SW2 are electrically connected to a first switch control pad SCP1, and the control terminals of the third to fifth switches SW3-SW5 are electrically connected to a second switch control pad SCP2.

In this embodiment, touch electrodes TE serve as common electrodes of pixel structures in the display period, and therefore in a first time period (also referred to as a display period), the touch electrodes TE serve as the common electrodes and are supplied with a common voltage, and pixel data is transmitted to the pixel electrodes of the pixel structure through the data lines DL for displaying an image. In a second time period (also referred to as a touch sensing period), the touch electrode TE is used for touch sensing. After the in-cell touch display device is tested, the first and second switch control pads SCP1, SCP2 are electrically connected to at least one integrated circuit chip capable of outputting a turn-off voltage in order to turn off the switches SW in the display period and the touch sensing period, such that the touch and display functions of the in-cell touch display device is prevented from being affected by the noises through the touch testing pad TTP and/or the source testing pad STP, but the invention is not limited thereto, and the varied embodiment (embodiment of FIG. 16A, FIG. 16B and FIG. 16C) will be described in detail as following.

Figure 16A:
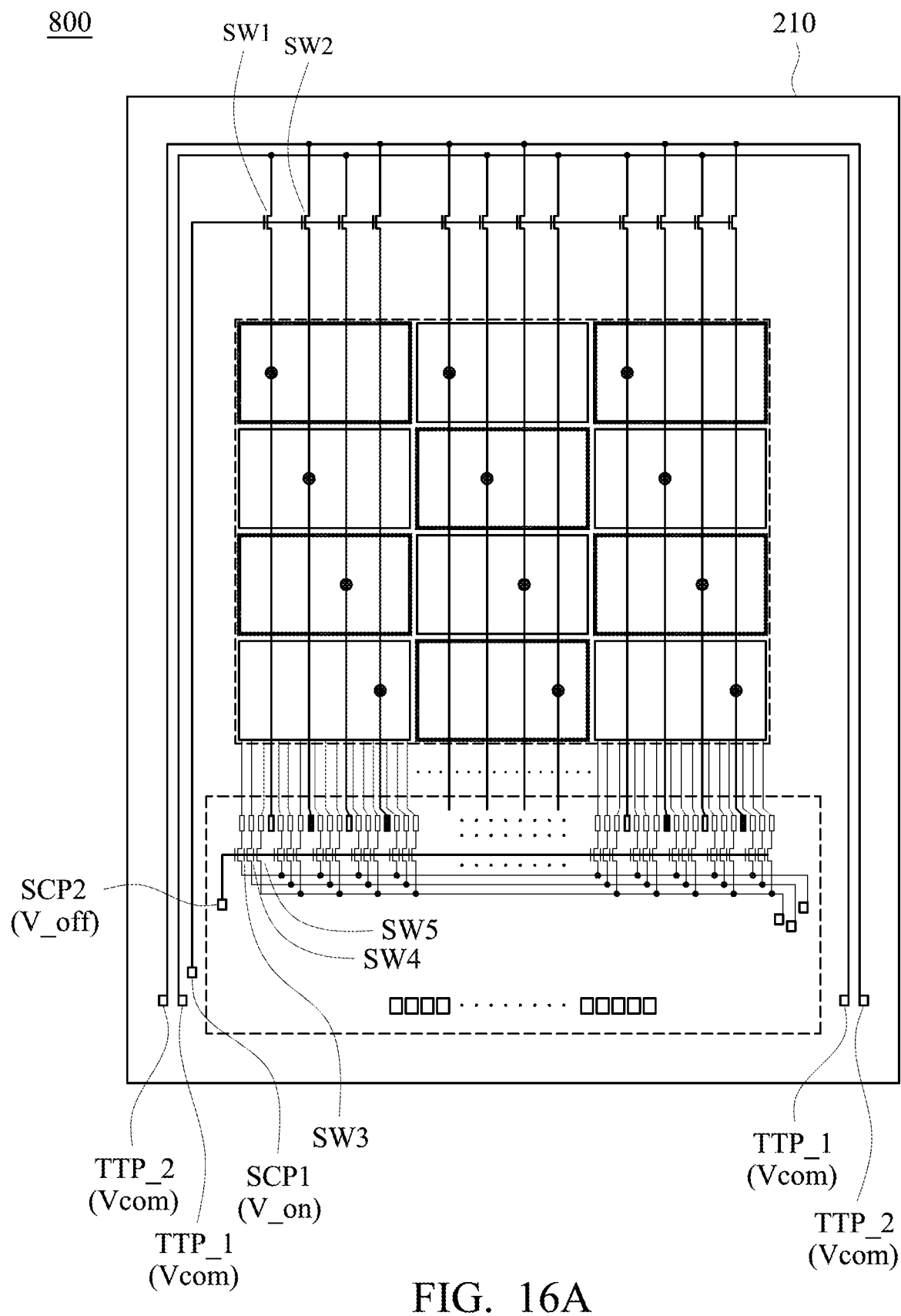
FIG. 16A is a diagram illustrating voltages and status of switches, testing pads and switch control pads in a display period.
Figure 16B:
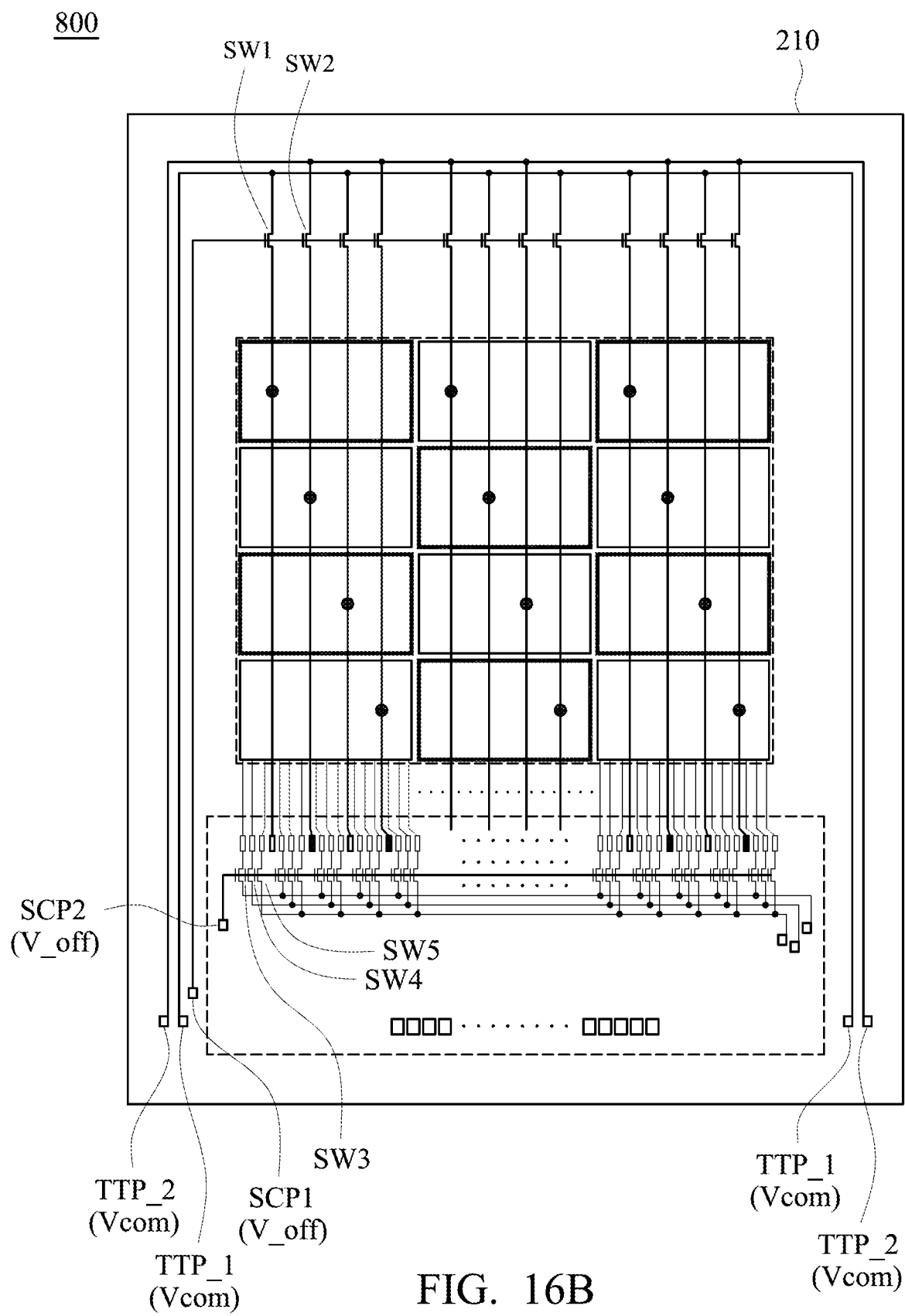
FIG. 16B is a diagram illustrating voltages and status of the switches, the testing pads and the switch control pads in a touch sensing period.
Figure 16C:
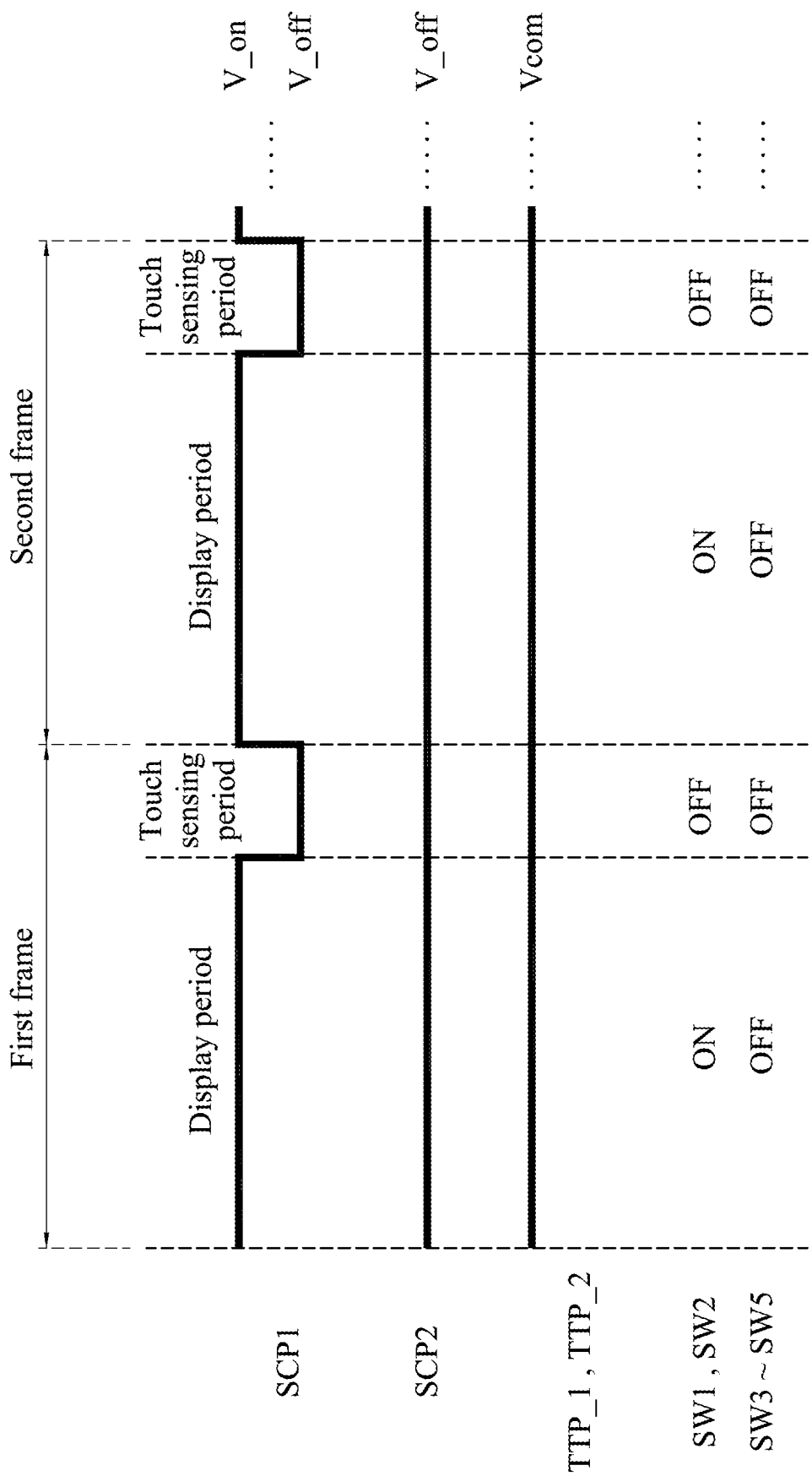
FIG. 16C is a time-sequence diagram illustrating voltages of the testing pads, and the switch control pads, and status of the corresponding switches.

Referring to FIG. 16A, FIG. 16B and FIG. 16C, FIG. 16A and FIG. 16B are diagrams illustrating voltages and status of the switches SW, the touch testing pads TTP and the switch control pads SCP in the display period and in the touch sensing period respectively after the touch pads TP, source pads SP, first and second switch control pads SCP1, SCP2, the first and second touch testing pads TTP_1, TTP_2 on the first substrate 210 are electrically connected to at least one integrated circuit chip. FIG. 16C is a timing diagram illustrating voltages of the touch testing pads TTP and the switch control pads SCP, and status of the corresponding switches SW after the touch pads TP, source pads SP, first and second switch control pads SCP1, SCP2, the first and second touch testing pads TTP_1, TTP_2 on the first substrate 210 are electrically connected to at least one integrated circuit chip. Note that the integrated circuit chip disposed in the bonding area 212 is omitted in FIG. 16A and FIG. 16B for simplification. The following Table 1 shows the status and the voltages of the switches SW, the touch testing pads TTP and the switch control pads SCP in the display period.

TABLE 1

| | display period |
|---|---|
| TTP_1, TTP_2 | common voltage Vcom |
| SCP1 | turn-on voltage V_on |
| SW1, SW2 | On |
| SCP2 | turn-off voltage V_off |
| SW3-SW5 | Off |

Referring to Table 1 and FIG. 16A, in the display period, the voltages of the touch pads TP and the first and second touch testing pads TTP_1, TTP_2 are equal to the common voltage Vcom, the voltage of the first switch control pad SCP1 is the turn-on voltage V_on to turn on the first switches SW1 and the second switches SW2. Therefore, the common voltage Vcom is transmitted to the touch electrodes TE serving as common electrodes through two paths. Regarding the first path, the common voltage Vcom is transmitted to the touch electrodes TE serving as common electrodes through the touch pads TP and the sensing lines SL. Regarding the second path, the common voltage Vcom is transmitted to the touch electrodes TE serving as common electrodes through the first and second touch testing pads TTP_1, TTP_2, turned-on switches SW1, SW2 and the sensing lines SL. Therefore, the common voltage Vcom is transmitted to the touch electrodes TE serving as common electrodes in the display area 202 through two opposite sides (e.g. the upper side and the lower side of the display area 202) in the display period. Compared with the embodiments described above, in which the common voltage Vcom is transmitted to the touch electrodes TE serving as common electrodes in the display 202 through a single side of the display area 202 (e.g. through lower side of the display area 202), the common voltage Vcom in the display area 202 is distributed more evenly in the embodiment, and thus the vision performance of the in-cell touch display device 800 is improved. The following Table 2 shows the status and the voltages of the switches SW, the touch testing pads TTP and the switch control pads SCP in the touch sensing period.

TABLE 2

| | touch sensing period |
|---|---|
| TTP_1, TTP_2 | common voltage Vcom |
| SCP1 | turn-off voltage V_off |

TABLE 2-continued

| | touch sensing period |
|---|---|
| SW1, SW2 | Off |
| SCP2 | turn-off voltage V_off |
| SW3-SW5 | Off |

Referring to Table 2 and FIG. 16B, in the touch sensing period, the touch electrodes TE are used for touch sensing, the touch pads TP and the sensing lines SL are used to transmit and/or receive the touch signals, and the voltage of the first switch control pad SCP1 is the turn-off voltage V_off to turn off the first and second switches SW1, SW2, and thus the common voltage Vcom is not transmitted to the touch electrodes TE and the touch electrodes TE are used for touch sensing. In other words, in the display period and in the touch sensing period, the voltages of the first and second touch testing pads TTP1, TTP2 are both equal to the common voltage Vcom. In the display period, the voltages of the control terminals of the first and second switches SW1, SW2 are both equal to the turn-on voltage V_on. That is, the voltage of the switch control pad SCP1, which is electrically connected to the first and second switches SW1, SW2, is equal to the turn-on voltage V_on to turn on the first and second switches SW1, SW2, and the common voltage Vcom is transmitted to the touch electrodes TE serving as common electrodes through the first and second touch testing pads TTP_1, TTP_2, the turned-on first and second switches SW1, SW2 and the first and second sensing lines SL_1, SL_2. In the embodiment, the turn-on voltage V_on is a gate high voltage (VGH), but the invention is not limited thereto. In the touch sensing period, the voltages of the control terminals of the first and second switches SW1, SW2 are equal to the turn-off voltage V_off. That is, the voltage of the switch control pad SCP1, which is electrically connected to the first and second switches SW1, SW2, is equal to the turn-off voltage V_off to turn off the first and second switches SW1, SW2. Accordingly, the common voltage Vcom cannot be transmitted to the touch electrode TE while the touch electrodes TE are used for touch sensing. In the embodiment, the turn-off voltage V_off is a gate low voltage (VGL), but the invention is not limited thereto. In addition, in the display period and in the touch sensing period, the third to fifth switches SW3-SW5 are turned off to prevent the touch and display function of the in-cell touch display device be affected by noises transmitted through the source testing pads STP, and thus the voltage of the control terminals of the third to fifth switches SW3-SW5 are equal to the turn-off voltage V_off. In other words, the voltage of the second switch control pad SCP2, which is electrically connected to the third to fifth switches SW3-SW5, is equal to the turn-off voltage V_off to turn off the third to fifth switches SW3-SW5.

Referring to FIG. 16C, as shown in FIG. 16C, one frame period is divided into one display period and one touch sensing period, but the invention is not limited thereto. In a varied embodiment, one frame period is divided into at least one display period and multiple touch sensing periods, or is divided into multiple display periods and at least one touch sensing period. In the display period, touch electrodes TE serve as common electrodes, and pixel data is transmitted to the pixel electrodes of the pixel structures through the data lines DL for displaying an image. In the touch sensing period, touch electrode TE is used for touch sensing. The voltage of the second switch control pad SCP2 is equal to the turn-off voltage V_off in both of the display period and the touch sensing period. The voltage of the first switch control pad SCP1 is equal to the turn-on voltage V_on in the display period and equal to the turn-off voltage V_off in the touch sensing period. That is, the first and second switches SW1, SW2 both perform on-off operation based the display period and the touch sensing period during the operation of the in-cell touch display device. Therefore, an integrated circuit chip electrically connected to the first switch control pad SCP1 provides the turn-on voltage V_on to the first switch control pad SCP1 in the display period in order to turn on the first and second switches SW1, SW2, and provides the turn-off voltage V_off to the first switch control pad SCP1 in the touch sensing period in order to turn off the first and second switches SW1, SW2. The turn-off voltage of the first switch control pad SCP1 may be identical to or different from the turn-off voltage of the second switch control pad SCP2 for turning off the first to fifth switches SW1-SW5. Note that the second switch control pad SCP2 is disposed in the bonding area 212, and the first switch control pads SCP1 and the first to second touch testing pads TTP_1, TTP_2 are disposed outside the bonding area 212 in FIG. 15, FIG. 16A and FIG. 16B, but the invention is not limited thereto. In another embodiment, the first and second switch control pads SCP1, SCP2 are disposed in the bonding area 212, and the first to second touch testing pads TTP_1, TTP_2 are disposed outside the bonding area 212. In yet another embodiment, the first to second switch control pads SCP1, SCP2 and the first to second touch testing pads TTP_1, TTP_2 are all disposed outside the bonding area 212 or are all disposed inside the bonding area 212. The voltages, status and timing diagram of the switches SW, the touch testing pads TTP and the switch control pads SCP in the varied embodiments described above are similar to that in FIGS. 16A-16C, and thus the descriptions are omitted. The turn-on voltage V_on and the turn-off voltage V_off applied to the first switch control pad SCP1, the turn-off voltage V_off applied to the second switch control pad SCP2 and the common voltage Vcom applied to the first and second touch testing pads TTP1, TTP2 in FIG. 16A-16C may be provided by at least one integrated circuit chip. For example, in one embodiment, the second switch control pad SCP2 may be electrically connected to an integrated circuit chip disposed in the bonding area 212, and the first switch control pad SCP1 and the first to second touch testing pads TTP_1, TTP_2 may be electrically connected to another at least one integrated circuit chip. The another at least one integrated circuit chip may be disposed on the first substrate 210 or a circuit board, the circuit board may be a printed circuit board (PCB) or a flexible printed circuit board (FPC) which is electrically connected to multiple bonding pins disposed on the first substrate 210, one of the bonding pins is electrically connected to the first switch control pad SCP1, and at least one of the bonding pins is electrically connected to the first and second touch testing pads TTP_1, TTP_2, but the invention is not limited thereto. For example, the another integrated circuit chip capable of outputting a common voltage Vcom may be disposed on a printed circuit board, and the printed circuit board is electrically connected to at least one bonding pin which is disposed on the first substrate 210 and electrically connected to the first and second touch testing pads TTP_1, TTP_2 through a flexible printed circuit board, or the another integrated circuit chip capable of outputting a common voltage Vcom may be disposed on a flexible printed circuit board electrically connected to at least one bonding pin which is disposed on the first substrate 210 and electrically connected to the first and second touch testing pads TTP_1, TTP_2. In another embodiment, the first and second switch control pads SCP1, SCP2 and the first and second touch testing pads TTP_1, TTP_2 may be electrically connected to an integrated circuit chip disposed in the bonding area 212, but the invention is not limited thereto. In yet another embodiment, the first and second switch control pads SCP1, SCP2 may be electrically connected to an integrated circuit chip disposed in the bonding area 212, and the first and second touch testing pads TTP_1, TTP_2 may be electrically connected to another integrated circuit chip disposed on the first substrate 210 or a circuit board, but the invention is not limited thereto. Note that it is illustrated in FIG. 16C that the voltage of the first and second touch testing pads TTP1, TTP2 are both equal to the common voltage Vcom in the display period and the touch sensing period, but the invention is not limited thereto. For example, in a varied embodiment, the voltage of the first and second touch testing pads TTP1, TTP2 are equal to the common voltage Vcom in the display period, and the first switch SW1 and the second switch SW2 are turned on; in the touch sensing period, the voltage of the first and second touch testing pads TTP1, TTP2 are other voltages or floating, and the first and the second switches SW1, SW2 are turned off.

As described above, after the testing method of the present invention is performed on the in-cell touch display device, at least one integrated circuit chip is electrically connect to the pads (e.g. touch pads TP, source pads SP, first and second switch control pads SCP1, SCP2, the first and second touch testing pads TTP_1, TTP_2) on the first substrate 210 for manufacturing the in-cell touch display device. In order to transmit the common voltage Vcom to the touch electrodes TE in the display area 202 through two sides of the display area 202 so that the common voltage Vcom in the display area 202 is distributed more evenly and the function and vision performance of the in-cell touch display device are prevented from being affected by the noises transmitted through the source testing pad STP, the present invention has the following configuration. First, the first to second touch testing pads TTP1, TTP2, the touch pads TP, the source pads SP and the first to second switch control pad SCP1, SCP2 are electrically connected to at least one integrated circuit chip after the testing method of the invention is performed. Second, the turn-off voltage V_off is provided to the second switch control pad SCP2 in the display period and the touch sensing period such that the third to fifth switches SW3-SW5 are turned off in the display period and the touch sensing period to prevent the in-cell touch display device from being affected by the noises transmitted through the source testing pad STP. Third, the turn-on voltage V_on is provided to the first switch control pad SCP1, and the common voltage Vcom is provided to the touch pads TP and the touch testing pads TTP in the display period, such that the first and second switches SW1, SW2 are turned on in the display period, and the common voltage is provided to the touch electrodes TE serving as common electrodes through a first path comprising the touch pads TP and the sensing lines SL and a second path comprising the first and second touch testing pads TTP_1, TTP_2, the first and second switches SW1, SW2 and the sensing lines SL, such that the common voltage Vcom is transmitted to the touch electrodes TE in the display area 202 through two sides of the display area 202 and the common voltage Vcom in the display area 202 is distributed more evenly. Fourth, the turn-off voltage V_off is provided to the first switch control pad SCP1 in the touch sensing period, such that the switches SW1, SW2 are turned off in the touch sensing period, and the touch electrodes TE are used for touch sensing. Compared with prior art, in which additional process steps are required to cut off the related units (e.g. switches) for reducing noises after the testing procedure is performed, in the present invention, the switches electrically connected to the data lines and/or gate lines are turned off by the integrated circuit chip after the testing is performed, and the additional process steps to cut off the switches utilized for testing are not required and the switches electrically connected to the touch electrodes are turned on and off respectively in the display period and in the touch sensing period. Therefore the interference of the noises is avoided without additional cut off processes performed after the testing, and the common voltage is distributed more evenly in the display are in the display period. As a result, the visual performance of the in-cell touch display device is improved.

Figure 17:
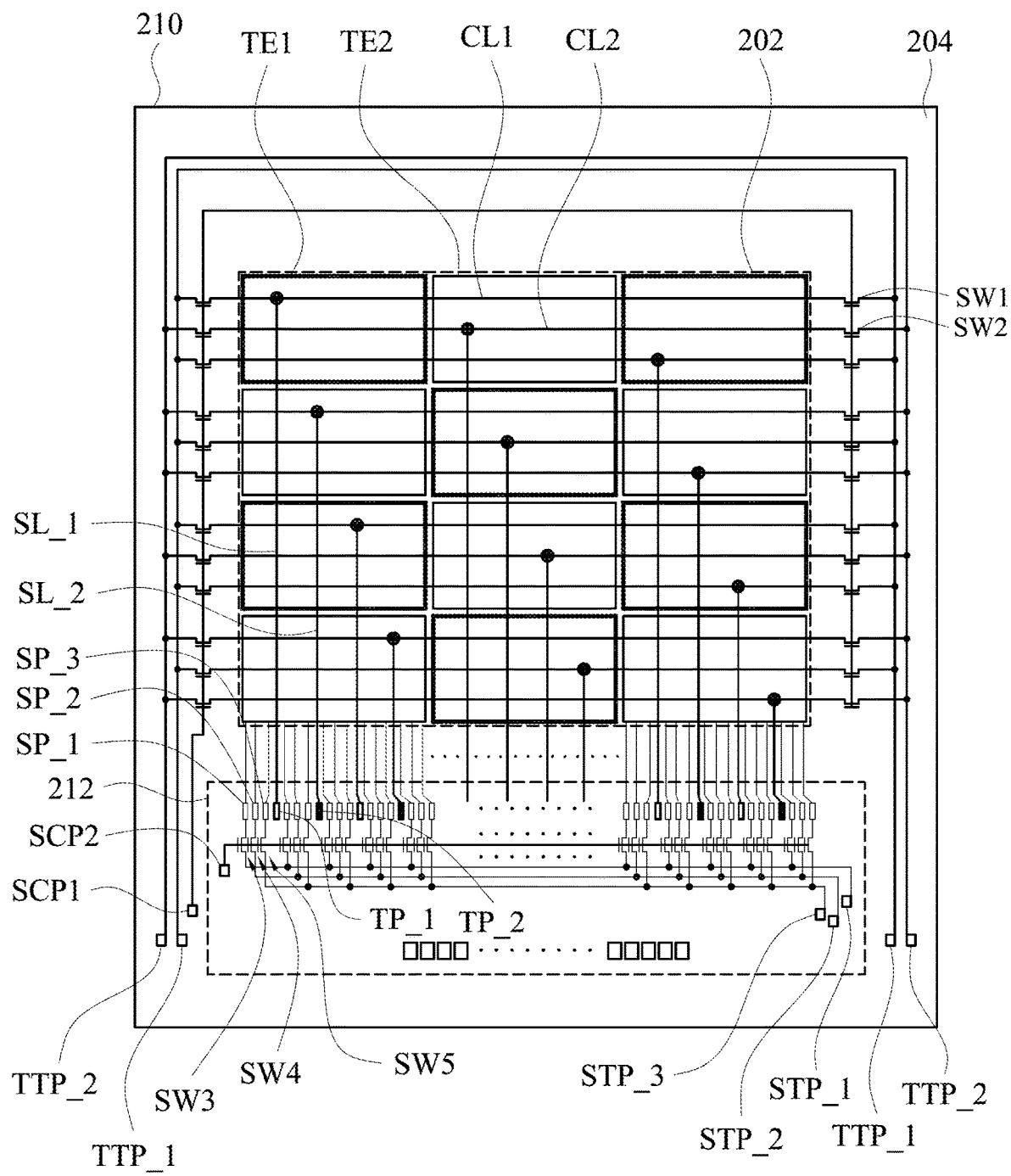
FIG. 17 is a schematic top view of an in-cell touch display device in accordance with a seventh embodiment.

Referring to FIG. 17, FIG. 17 is a schematic top view of an in-cell touch display device in accordance with a seventh embodiment. The difference between FIG. 17 and FIG. 15 is that in FIG. 15, the first and second switches SW1, SW2 which are electrically connected to the first and second touch electrodes TE1, TE2 are disposed in the non-display area 204 above the display area 202, but in an in-cell touch display device 900 of FIG. 17, the first and second switches SW1, SW2 are disposed in the non-display area 204 at two sides of the display area 202. Therefore, the first terminals of the first and second switches SW1, SW2 are respectively electrically connected to first conductive lines CL1 and second conductive lines CL2 extending along the first direction D1. The first and second conductive lines CL1, CL2 are electrically connected to first sensing lines SL_1 and second sensing lines SL_2 extending along the second direction D2 respectively. Accordingly, the first terminals of the first and second switches SW1, SW2 are electrically connected to the first and second touch electrodes TE1, TE2, respectively. In a varied embodiment, the first and second switches SW1, SW2 are only disposed in the non-display area 204 at the left side or at the right side of the display area 212, or the first and second switches SW1, SW2 are disposed in the non-display area 204 at the left, right and top side of the display area 212.

Similar to the embodiment of FIG. 15, in the present embodiment, after the test, the first and second touch testing pads TTP_1, TTP_2 are electrically connected to an integrated circuit chip capable of providing the common voltage. In the display period, the voltage of the first switch control pad SCP1 is equal to the turn-on voltage V_on so that the common voltage Vcom is transmitted to the touch electrodes TE through the first and second touch testing pads TTP_1, TTP_2, the first and second switches SW1, SW2 which are turned on and the first and second sensing lines SL_1, SL_2; in the touch sensing period, the voltage of the first switch control pad SCP1 is equal to the turn-off voltage V_off to turn off the first and second switches SW1, SW2 so that the common voltage Vcom is not transmitted to the touch electrodes TE serving as common electrodes, and thus the touch electrodes TE are used for touch sensing. In addition, in the display period and in the touch sensing period, the second switch control pad SCP2 is electrically connected to the turn-off voltage V_off to turn off the third to fifth switches SW3-SW5. The turn-on voltage V_on and the turn-off voltage V_off may be provided by at least one integrated circuit chip.

In summary, in the embodiments of FIG. 15 and FIG. 17, the third to fifth switches SW3-SW5 which are electrically connected to the data lines DL_1-DL_3 are disposed in the bonding area 212 of the non-display area 204 at one side of the display area 202 in the in-cell touch display device. The first and second switches SW1, SW2 which are electrically connected to the touch electrodes TE1 and TE2 are disposed in the non-display area 204 at at least one of the other sides of the display area 202. Note that the display area of FIG. 15 and FIG. 17 are rectangular, but the invention is not limited thereto. In a varied embodiment, the third to fifth switches SW3-SW5 are disposed in the non-display area at one side of a non-rectangular display area, and the first and second switches SW1, SW2 are disposed in the non-display at at least one of the other sides of the non-rectangular display area. In addition, although two first touch testing pads TTP_1 and two second touch testing pads TTP_2 are shown in FIG. 15 and FIG. 17, the invention is not limited thereto. In a varied embodiment, the in-cell touch display device may have only one first touch testing pad TTP_1 and one second touch testing pad TTP_2.

Figure 18:
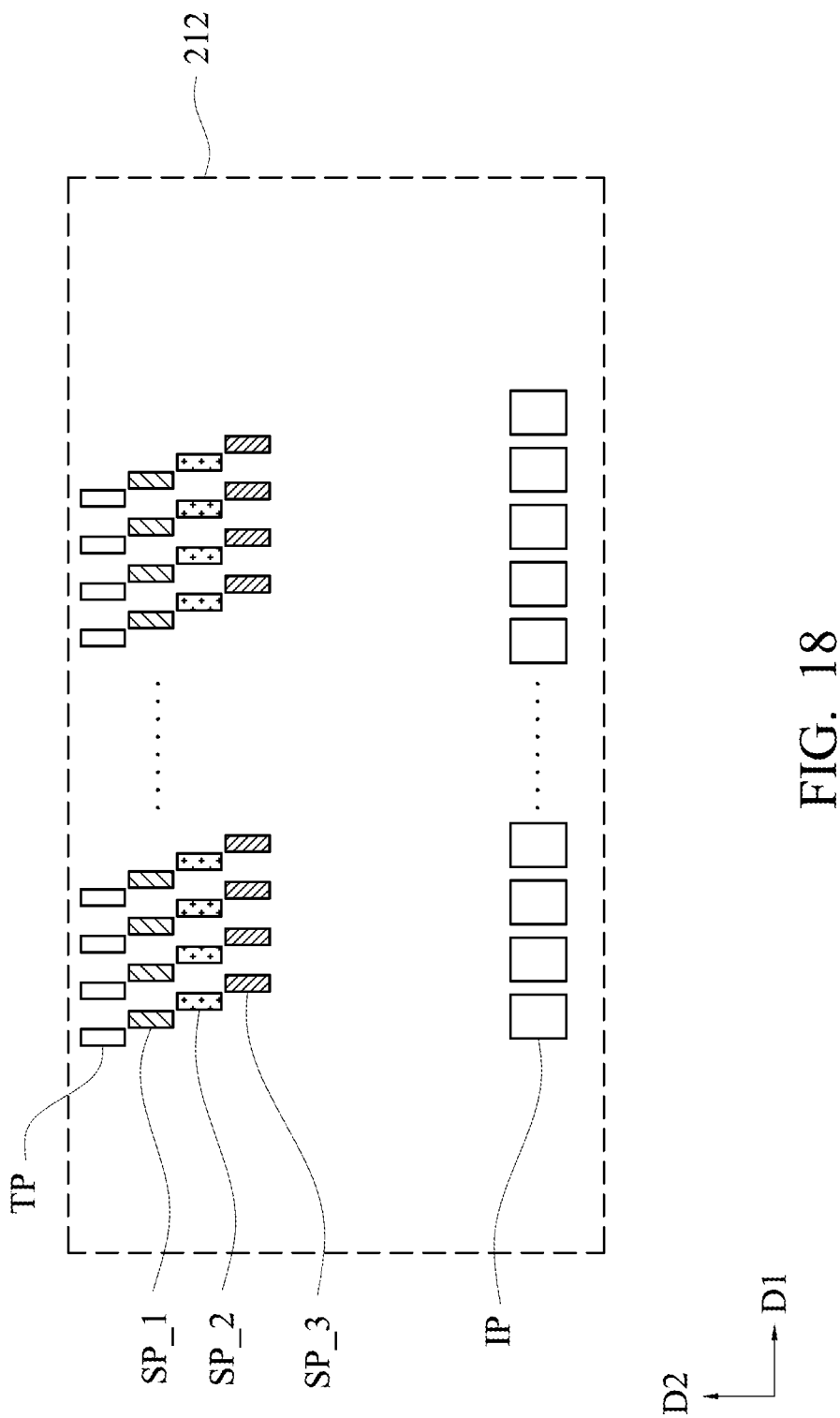
FIG. 18 is a schematic top view of touch pads and source pads of an in-cell touch display device in accordance with a varied embodiment.

In the embodiments of FIG. 8, FIG. 9A, FIG. 10, FIG. 12, FIG. 13A, FIG. 15, and FIG. 17, the touch pads TP and the source pads SP are arranged as one row, and the touch pads TP are interleaved with the source pads SP. Note that the "the touch pads TP are interleaved with the source pads SP" means that one pad TP is interleaved with one pad SP; multiple touch pads TP are interleaved with one source pad SP, or one touch pad TP is interleaved with multiple source pads SP. In the embodiment of FIG. 11A, the touch pads TP and the source pads SP are arranged as one row, and the touch pads TP are disposed at two sides of the source pads SP, that is, the source pads SP are disposed between two touch pads TP. However, the arrangements of the touch pads TP and the source pads SP are not limited thereto. Referring to FIG. 18, FIG. 18 is a schematic top view of the touch pads TP and the source pads SP of an in-cell touch display device in accordance with a varied embodiment. As shown in FIG. 18, the touch pads TP, the first source pads SP_1, the second source pads SP_2 and the third source pads SP_3 are respectively arranged as rows extending along the first direction D1. The locations of the pads in one row are mismatched with the locations of the pads in the adjacent row so that the pads in two adjacent rows are not overlapped with each other or partially overlapped with each other along the second direction D2. The arrangements of the touch pads TP and the source pads SP in the embodiment may be applied to all the aforementioned embodiments of the in-cell touch display device.

Figure 19:
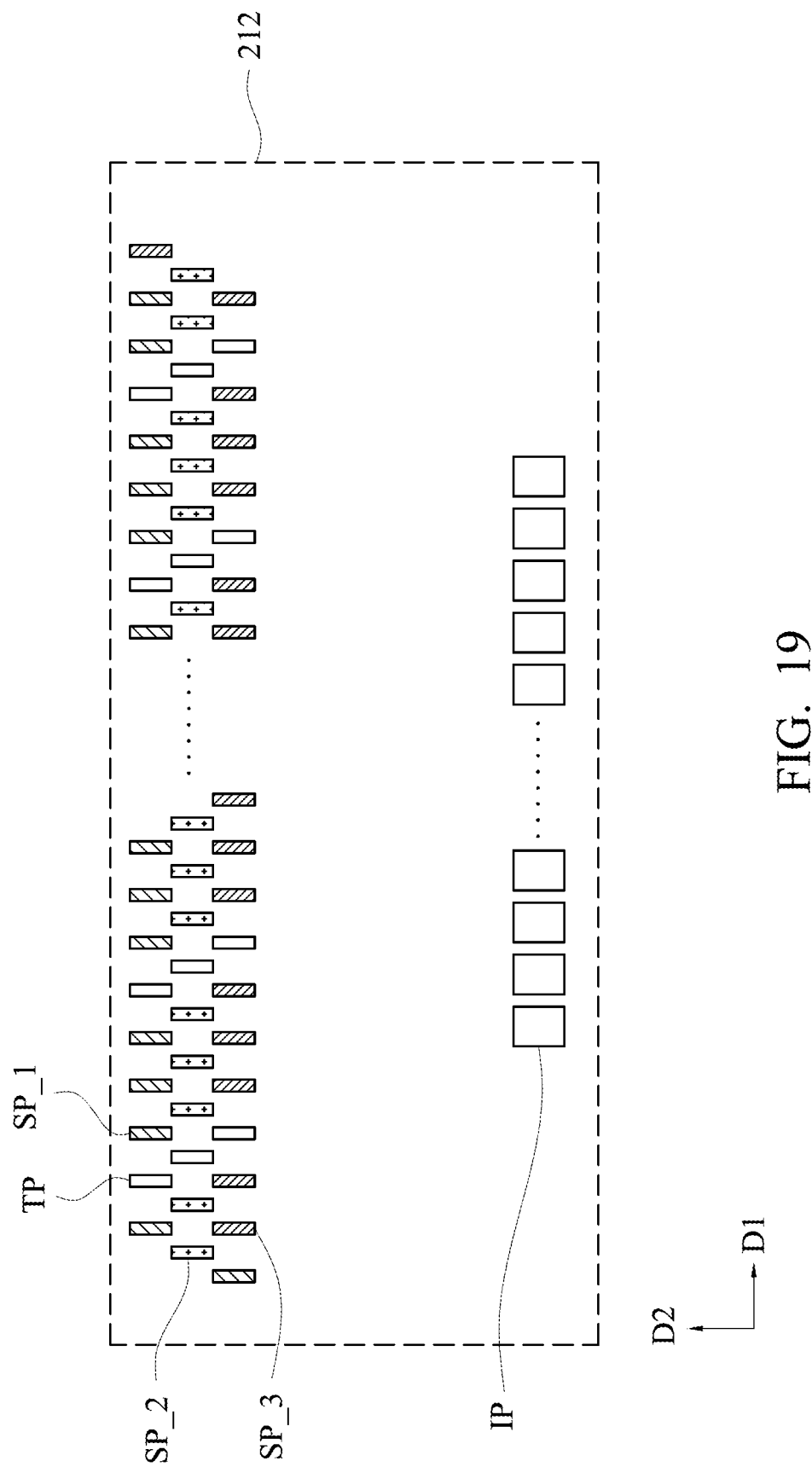
FIG. 19 is a schematic top view of touch pads and source pads of an in-cell touch display device in accordance with another varied embodiment.

Referring to FIG. 19, FIG. 19 is a schematic top view of the touch pads TP and the source pads SP of an in-cell touch display device in accordance with another varied embodiment. As shown in FIG. 19, the touch pads TP, the first source pads SP_1, the second source pads SP_2 and the third source pads SP_3 are arranged as rows extending along the first direction D1. The first row includes interleaved touch pads TP and first source pads SP_1. The second row includes interleaved touch pads TP and second source pads SP_2. The third row includes interleaved touch pads TP and third source pads SP_3. The locations of the pads in one row are mismatched with the locations of the pads in the adjacent row along the second direction D2 so that the pads in two adjacent rows are not overlapped with each other or partially overlapped with each other along the second direction. In the embodiments of FIG. 18 and FIG. 19, the first direction D1 is perpendicular to the second direction D2. Note that three first source pads SP_1, three second source pads SP_2 or three third source pads SP_3 are disposed between two touch pads TP in the corresponding row, but the invention is not limited thereto. In a varied embodiment, one first source pad SP_1, one second source pad SP_2, and one third source pads SP_3 are disposed between two touch pads TP in each row. In other words, the touch pads TP, the first source pads SP_1, the second source pads SP_2, and the third source pads SP_3 are arranged as a first row, a second row, a third row extending along a first direction D1, at least one of the first source pads SP_1 is disposed between two of the touch pads TP in the first row, at least one of the second source pads SP_2 is disposed between two of the touch pads TP in the second row, and at least one of the third source pads SP_3 is disposed between two of the touch pads TP in the third row. The arrangement of the touch pads TP and the source pads SP may be applied to all the aforementioned embodiments of the in-cell touch display device.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An in-cell touch display device having a display area and a non-display area, the in-cell touch display device comprising:
   a first substrate;
   a plurality of data lines and a plurality of gate lines disposed on the first substrate, wherein the data lines comprise a plurality of first data lines, a plurality of second data lines and a plurality of third data lines, and the first data lines, the second data lines and the third data lines are electrically connected to a plurality of pixel units with different colors respectively;
   a plurality of touch electrodes comprising a plurality of first touch electrodes and a plurality of second touch electrodes;
   a plurality of sensing lines comprising a plurality of first sensing lines and a plurality of second sensing lines, wherein the first touch electrodes are electrically connected to the first sensing lines respectively, and the second touch electrodes are electrically connected to the second sensing lines respectively;
   a plurality of touch pads disposed on the first substrate and in the non-display area, wherein the touch pads comprise a plurality of first touch pads and a plurality of second touch pads, the first touch pads are electrically connected to the first sensing lines respectively, and the second touch pads are electrically connected to the second sensing lines respectively;
   a plurality of source pads disposed on the first substrate and in the non-display area, wherein the source pads are electrically connected to the data lines respectively, the source pads comprise a plurality of first source pads, a plurality of second source pads and a plurality of third source pads, the first source pads are electrically connected to the first data lines respectively, the second source pads are electrically connected to the second data lines respectively, and the third source pads are electrically connected to the third data lines respectively, wherein the touch pads, the first source pads, the second source pads, and the third source pads are arranged as a first row, a second row, a third row extending along a first direction, at least one of the first source pads is disposed between two of the touch pads in the first row, at least one of the second source pads is disposed between two of the touch pads in the second row, and at least one of the third source pads is disposed between two of the touch pads in the third row;

a plurality of switches disposed on the first substrate and in the non-display area, wherein each of the switches has a first terminal, a second terminal, and a control terminal, and the switches comprise:

a plurality of first switches, wherein the first terminals of the first switches are electrically connected to the first touch pads respectively, the control terminals of the first switches are electrically connected to each other, and the second terminals of the first switches are electrically connected to each other; and a plurality of second switches, wherein the first terminals of the second switches are electrically connected to the second touch pads respectively, the control terminals of the second switches are electrically connected to each other, and the second terminals of the second switches are electrically connected to each other; and an integrated circuit chip disposed in the non-display area, wherein the integrated circuit chip comprises a plurality of first bonding pads and a plurality of second bonding pads, wherein the first bonding pads are electrically connected to the source pads respectively, and the second bonding pads are electrically connected to the touch pads respectively.

2. The in-cell touch display device of claim 1, wherein the first and second switches are turned off in a touch sensing period of the in-cell touch display device, and the first and second switches are turned on in a display period of the in-cell touch sensing device.

3. The in-cell touch display device of claim 2, further comprising a first touch testing pad and a second touch testing pad disposed on the first substrate and in the non-display area, wherein the first touch testing pad is electrically connected to the second terminals of the first switches, and the second touch testing pad is electrically connected to the second terminals of the second switches, wherein in the display period of the in-cell touch display device, voltages of the first touch testing pad and the second touch testing pad are equal to a common voltage.

4. The in-cell touch display device of claim 3, wherein voltages of the touch electrodes are equal to the common voltage in the display period of the in-cell touch display device, and the common voltage is transmitted to the touch electrodes through a first path comprising the touch pads and the sensing lines and a second path comprising the first and second touch testing pads, the first and second switches and the sensing lines.

5. The in-cell touch display device of claim 3, further comprising a switch control pad disposed on the first substrate and in the non-display area, wherein the switch control pad is electrically connected to the control terminals of the first switches and the control terminals of the second switches, wherein in the display period, a voltage of the switch control pad is equal to a turn-on voltage, so as to turn on the first switches and the second switches, wherein in the touch sensing period, the voltage of the switch control pad is equal to a turn-off voltage, so as to turn off the first switches and the second switches.

6. The in-cell touch display device of claim 5, wherein the integrated circuit chip provides the turn-on voltage to the switch control pad in the display period, and provides the turn-off voltage to the switch control pad in the touch sensing period.

7. The in-cell touch display device of claim 1, wherein the touch electrodes are arranged as a plurality of touch electrode columns and a plurality of touch electrode rows, and each of the touch electrode rows and the touch electrode columns comprises a portion of the first touch electrodes and a portion of the second touch electrodes which are interleaved with each other.

8. The in-cell touch display device of claim 1, wherein the first switches, the second switches and the touch pads are disposed in the non-display area at a side of the display area, each of the first switches is electrically connected to corresponding one of the first sensing lines through a corresponding first touch pad, and each of the second switches is electrically connected to corresponding one of the second sensing lines through a corresponding second touch pad.

9. The in-cell touch display device of claim 1, wherein the touch pads are disposed in a portion of the non-display area at a side of the display area, and the first switches and second switches are disposed in another portion of the non-display area at at least one of other sides of the display area.

10. The in-cell touch display device of claim 9, wherein the touch pads are disposed below the display area, and the first and second switches are disposed above the display area when viewed in a direction perpendicular to the first substrate.

11. The in-cell touch display device of claim 9, wherein the touch pads are disposed below the display area, and at least a portion of the first and second switches are disposed at a left side or a right side of the display area when viewed in a direction perpendicular to the first substrate.

12. The in-cell touch display device of claim 1, wherein the first switches and the second switches are turned off in a display period and in a touch sensing period of the in-cell touch display device.

13. The in-cell touch display device of claim 12, further comprising a switch control pad disposed on the first substrate and in the non-display area, wherein the switch control pad is electrically connected to the control terminals of the first switches and the control terminals of the second switches, wherein a voltage of the switch control pad is equal to a turn-off voltage in the display period and the touch sensing period of the in-cell touch display device, so as to turn off the first switches and the second switches.

14. The in-cell touch display device of claim 13, wherein the integrated circuit chip is electrically connected to the switch control pad and provides the turn-off voltage to the switch control pad in the display period and the touch sensing period of the in-cell touch display device.

15. The in-cell touch display device of claim 1, wherein the switches further comprise:

a plurality of third switches, wherein the first terminals of the third switches are electrically connected to the first data lines respectively, the control terminals of the third switches are electrically connected to each other, and the second terminals of the third switches are electrically connected to each other;

a plurality of fourth switches, wherein the first terminals of the fourth switches are electrically connected to the second data lines respectively, the control terminals of the fourth switches are electrically connected to each other, and the second terminals of the fourth switches are electrically connected to each other; and a plurality of fifth switches, wherein the first terminals of the fifth switches are electrically connected to the third data lines respectively, the control terminals of the fifth switches are electrically connected to each other, and the second terminals of the fifth switches are electrically connected to each other, wherein the in-cell touch display device further comprises a first source testing pad, a second source testing pad, and a third source testing pad disposed on the first substrate and in the non-display area, wherein the first source testing pad is electrically connected to the second terminals of the third switches, the second source testing pad is electrically connected to the second terminals of the fourth switches, and the third source testing pad is electrically connected to the second terminals of the fifth switches.

16. The in-cell touch display device of claim 15, wherein the third switches, the fourth switches and the fifth switches are turned off in a display period and in a touch sensing period of the in-cell touch display device.

17. The in-cell touch display device of claim 15, wherein each of the third switches is electrically connected to a corresponding one of the first data lines through a corresponding one of the first source pads, each of the fourth switches is electrically connected to a corresponding one of the second data lines through a corresponding one of the second source pads, and each of the fifth switches is electrically connected to a corresponding one of the third data lines through a corresponding one of the third source pads.

* * * * *